(12) United States Patent
Lindemann et al.

(10) Patent No.: US 10,706,132 B2
(45) Date of Patent: Jul. 7, 2020

(54) SYSTEM AND METHOD FOR ADAPTIVE USER AUTHENTICATION

(71) Applicant: NOK NOK LABS, INC., Palo Alto, CA (US)

(72) Inventors: Rolf Lindemann, Steele (DE); Davit Baghdasaryan, San Francisco, CA (US)

(73) Assignee: NOK NOK LABS, INC., Palo Alto, CA (US)

( * ) Notice: Subject to any disclaimer, the term of this patent is extended or adjusted under 35 U.S.C. 154(b) by 733 days.

(21) Appl. No.: 14/145,466

(22) Filed: Dec. 31, 2013

(65) Prior Publication Data

US 2014/0289820 A1 Sep. 25, 2014

Related U.S. Application Data

(60) Provisional application No. 61/804,568, filed on Mar. 22, 2013.

(51) Int. Cl.
*G06F 21/32* (2013.01)
*G06Q 20/40* (2012.01)
(Continued)

(52) U.S. Cl.
CPC ............ *G06F 21/32* (2013.01); *G06F 21/577* (2013.01); *G06Q 20/204* (2013.01);
(Continued)

(58) Field of Classification Search
CPC ................................ G06Q 20/40; G06F 21/30
See application file for complete search history.

(56) References Cited

U.S. PATENT DOCUMENTS 5,272,754 A 12/1993 Boerbert et al.
5,280,527 A 1/1994 Gullman et al.
(Continued)

FOREIGN PATENT DOCUMENTS

CN 1705925 A 12/2005
CN 101394283 A 3/2009
(Continued)

OTHER PUBLICATIONS

Abate A., et al.,"2D and 3D face recognition: A survey", 2007, pp. 1885-1906.
(Continued)

*Primary Examiner* — Daniel I Walsh
(74) *Attorney, Agent, or Firm* — Nicholson De Vos Webster & Elliott LLP

(57) ABSTRACT

A system, apparatus, method, and machine readable medium are described for adaptive authentication. For example, one embodiment of an apparatus comprises: an adaptive authentication module to receive a client request to perform a transaction which requires authentication; a risk engine to analyze first data related to a client to determine a risk value associated with the client; an assurance level gain analysis module to determine an assurance level required for allowing the client to complete the transaction and to determine an assurance level gain required to arrive at the assurance level based on the risk value; the adaptive authentication module to select one or more authentication techniques based at least in part on the indication of the assurance level gain.

20 Claims, 12 Drawing Sheets

(51) Int. Cl.
*G07F 19/00* (2006.01)
*G06Q 20/20* (2012.01)
*G06Q 20/32* (2012.01)
*G06Q 20/42* (2012.01)
*H04L 29/06* (2006.01)
*H04L 9/32* (2006.01)
*H04L 9/08* (2006.01)
*G06F 21/57* (2013.01)
*H04W 12/06* (2009.01)

(52) U.S. Cl.
CPC ..... *G06Q 20/3224* (2013.01); *G06Q 20/3274* (2013.01); *G06Q 20/3278* (2013.01); *G06Q 20/4012* (2013.01); *G06Q 20/40145* (2013.01); *G06Q 20/42* (2013.01); *G06Q 20/425* (2013.01); *G07F 19/20* (2013.01); *H04L 9/0819* (2013.01); *H04L 9/0822* (2013.01); *H04L 9/0841* (2013.01); *H04L 9/3231* (2013.01); *H04L 9/3247* (2013.01); *H04L 9/3297* (2013.01); *H04L 63/0492* (2013.01); *H04L 63/08* (2013.01); *H04L 63/083* (2013.01); *H04L 63/0861* (2013.01); *H04L 63/20* (2013.01); *G06F 2221/2115* (2013.01); *H04L 2209/805* (2013.01); *H04L 2463/102* (2013.01); *H04W 12/06* (2013.01)

(56) References Cited

U.S. PATENT DOCUMENTS

| | | | |
|---|---|---|---|
| 5,764,789 A | 6/1998 | Pare, Jr. et al. | |
| 5,892,900 A | 4/1999 | Ginter et al. | |
| 6,035,406 A | 3/2000 | Moussa et al. | |
| 6,088,450 A | 7/2000 | Davis et al. | |
| 6,178,511 B1 | 1/2001 | Cohen et al. | |
| 6,270,011 B1 | 8/2001 | Gottfried | |
| 6,377,691 B1 | 4/2002 | Swift et al. | |
| 6,510,236 B1 | 1/2003 | Crane et al. | |
| 6,588,812 B1* | 7/2003 | Garcia | G09F 3/0352 292/307 A |
| 6,618,806 B1 | 9/2003 | Brown et al. | |
| 6,751,733 B1 | 6/2004 | Nakamura et al. | |
| 6,801,998 B1 | 10/2004 | Hanna et al. | |
| 6,842,896 B1 | 1/2005 | Redding et al. | |
| 6,938,156 B2 | 8/2005 | Wheeler et al. | |
| 7,155,035 B2 | 12/2006 | Kondo et al. | |
| 7,194,761 B1 | 3/2007 | Champagne | |
| 7,194,763 B2 | 3/2007 | Potter et al. | |
| 7,263,717 B1 | 8/2007 | Boydstun et al. | |
| 7,444,368 B1 | 10/2008 | Wong et al. | |
| 7,487,357 B2 | 2/2009 | Smith et al. | |
| 7,512,567 B2 | 3/2009 | Bemmel et al. | |
| 7,698,565 B1 | 4/2010 | Bjorn et al. | |
| 7,865,937 B1 | 1/2011 | White et al. | |
| 7,941,669 B2 | 5/2011 | Foley et al. | |
| 8,060,922 B2 | 11/2011 | Crichton et al. | |
| 8,166,531 B2 | 4/2012 | Suzuki | |
| 8,185,457 B1* | 5/2012 | Bear | G06Q 20/00 705/35 |
| 8,245,030 B2 | 8/2012 | Lin | |
| 8,284,043 B2 | 10/2012 | Judd et al. | |
| 8,291,468 B1 | 10/2012 | Chickering | |
| 8,353,016 B1 | 1/2013 | Pravetz et al. | |
| 8,359,045 B1 | 1/2013 | Hopkins, III | |
| 8,412,928 B1 | 4/2013 | Bowness | |
| 8,458,465 B1* | 6/2013 | Stern | H04L 63/0861 709/229 |
| 8,489,506 B2* | 7/2013 | Hammad | G06Q 20/085 235/380 |
| 8,516,552 B2 | 8/2013 | Raleigh | |
| 8,526,607 B2 | 9/2013 | Liu et al. | |
| 8,555,340 B2 | 10/2013 | Potter et al. | |
| 8,561,152 B2 | 10/2013 | Novak et al. | |
| 8,584,219 B1* | 11/2013 | Toole | G06F 21/60 726/25 |
| 8,584,224 B1 | 11/2013 | Pei et al. | |
| 8,607,048 B2 | 12/2013 | Nogawa | |
| 8,646,060 B1 | 2/2014 | Ben | |
| 8,713,325 B2 | 4/2014 | Ganesan | |
| 8,719,905 B2 | 5/2014 | Ganesan | |
| 8,745,698 B1* | 6/2014 | Ashfield | H04L 63/08 726/4 |
| 8,776,180 B2 | 7/2014 | Kumar et al. | |
| 8,843,997 B1 | 9/2014 | Hare | |
| 8,856,541 B1* | 10/2014 | Chaudhury | G06F 21/32 382/115 |
| 8,949,978 B1 | 2/2015 | Lin et al. | |
| 8,958,599 B1 | 2/2015 | Starner | |
| 8,978,117 B2 | 3/2015 | Bentley et al. | |
| 9,015,482 B2 | 4/2015 | Baghdasaryan et al. | |
| 9,032,485 B2 | 5/2015 | Chu et al. | |
| 9,083,689 B2 | 7/2015 | Lindemann et al. | |
| 9,161,209 B1 | 10/2015 | Ghoshal et al. | |
| 9,171,306 B1* | 10/2015 | He | G06Q 30/0185 |
| 9,172,687 B2 | 10/2015 | Baghdasaryan et al. | |
| 9,219,732 B2 | 12/2015 | Baghdasaryan et al. | |
| 9,306,754 B2 | 4/2016 | Baghdasaryan et al. | |
| 9,317,705 B2* | 4/2016 | O'Hare | H04L 9/3231 |
| 9,367,678 B2* | 6/2016 | Pal | G06F 21/33 |
| 9,396,320 B2* | 7/2016 | Lindemann | G06Q 20/42 |
| 9,521,548 B2 | 12/2016 | Fosmark et al. | |
| 9,547,760 B2 | 1/2017 | Kang et al. | |
| 9,633,322 B1* | 4/2017 | Burger | G06Q 10/0635 |
| 9,698,976 B1 | 7/2017 | Statica et al. | |
| 2001/0037451 A1 | 11/2001 | Bhagavatula et al. | |
| 2002/0010857 A1 | 1/2002 | Karthik | |
| 2002/0016913 A1 | 2/2002 | Wheeler et al. | |
| 2002/0037736 A1 | 3/2002 | Kawaguchi et al. | |
| 2002/0040344 A1* | 4/2002 | Preiser | G06Q 20/102 705/42 |
| 2002/0054695 A1* | 5/2002 | Bjorn | G06F 3/03547 382/124 |
| 2002/0073316 A1 | 6/2002 | Collins et al. | |
| 2002/0073320 A1 | 6/2002 | Rinkevich et al. | |
| 2002/0087894 A1 | 7/2002 | Foley et al. | |
| 2002/0112170 A1 | 8/2002 | Foley et al. | |
| 2002/0174344 A1 | 11/2002 | Ting | |
| 2002/0174348 A1 | 11/2002 | Ting | |
| 2002/0190124 A1 | 12/2002 | Piotrowski | |
| 2003/0021283 A1 | 1/2003 | See et al. | |
| 2003/0055792 A1 | 3/2003 | Kinoshita et al. | |
| 2003/0065805 A1 | 4/2003 | Barnes et al. | |
| 2003/0084300 A1 | 5/2003 | Koike | |
| 2003/0087629 A1 | 5/2003 | Juitt et al. | |
| 2003/0115142 A1 | 6/2003 | Brickell et al. | |
| 2003/0135740 A1 | 7/2003 | Talmor et al. | |
| 2003/0152252 A1 | 8/2003 | Kondo et al. | |
| 2003/0226036 A1 | 12/2003 | Bivens et al. | |
| 2003/0236991 A1 | 12/2003 | Letsinger | |
| 2004/0039909 A1 | 2/2004 | Cheng | |
| 2004/0101170 A1 | 5/2004 | Tisse et al. | |
| 2004/0123153 A1 | 6/2004 | Wright et al. | |
| 2005/0021964 A1 | 1/2005 | Bhatnagar et al. | |
| 2005/0080716 A1* | 4/2005 | Belyi | G06Q 40/08 705/38 |
| 2005/0097320 A1* | 5/2005 | Golan | G06F 21/40 713/166 |
| 2005/0100166 A1 | 5/2005 | Smetters et al. | |
| 2005/0125295 A1* | 6/2005 | Tidwell | G06Q 20/042 705/16 |
| 2005/0160052 A1 | 7/2005 | Schneider et al. | |
| 2005/0187883 A1 | 8/2005 | Bishop et al. | |
| 2005/0223217 A1 | 10/2005 | Howard et al. | |
| 2005/0223236 A1 | 10/2005 | Yamada et al. | |
| 2005/0278253 A1 | 12/2005 | Meek et al. | |
| 2006/0026671 A1 | 2/2006 | Potter et al. | |
| 2006/0029062 A1 | 2/2006 | Rao et al. | |
| 2006/0064582 A1 | 3/2006 | Teal et al. | |
| 2006/0101136 A1 | 5/2006 | Akashika et al. | |
| 2006/0149580 A1* | 7/2006 | Helsper | G06Q 30/06 235/383 |

(56) References Cited

U.S. PATENT DOCUMENTS

| | | |
|---|---|---|
| 2006/0156385 A1 | 7/2006 | Chiviendacz et al. |
| 2006/0161435 A1 | 7/2006 | Atef et al. |
| 2006/0161672 A1 | 7/2006 | Jolley et al. |
| 2006/0174037 A1 | 8/2006 | Bernardi et al. |
| 2006/0177061 A1* | 8/2006 | Orsini .................. G06F 21/606 380/268 |
| 2006/0195689 A1 | 8/2006 | Blecken et al. |
| 2006/0213978 A1* | 9/2006 | Geller .................. G06Q 20/10 235/380 |
| 2006/0282670 A1 | 12/2006 | Karchov |
| 2007/0005988 A1* | 1/2007 | Zhang .................. G06F 21/32 713/186 |
| 2007/0038568 A1* | 2/2007 | Greene .................. G06Q 20/40 705/50 |
| 2007/0077915 A1 | 4/2007 | Black et al. |
| 2007/0087756 A1* | 4/2007 | Hoffberg .................. G06Q 20/22 455/450 |
| 2007/0088950 A1 | 4/2007 | Wheeler et al. |
| 2007/0094165 A1 | 4/2007 | Gyorfi et al. |
| 2007/0100756 A1 | 5/2007 | Varma |
| 2007/0101138 A1 | 5/2007 | Camenisch et al. |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0198435 A1 | 8/2007 | Siegal et al. |
| 2007/0217590 A1 | 9/2007 | Loupia et al. |
| 2007/0234417 A1 | 10/2007 | Blakley, III et al. |
| 2007/0239980 A1 | 10/2007 | Funayama |
| 2007/0278291 A1 | 12/2007 | Rans et al. |
| 2007/0286130 A1 | 12/2007 | Shao et al. |
| 2007/0288380 A1* | 12/2007 | Starrs .................. G06Q 20/042 705/45 |
| 2008/0005562 A1 | 1/2008 | Sather et al. |
| 2008/0024302 A1* | 1/2008 | Yoshida .................. G06F 21/88 340/572.1 |
| 2008/0025234 A1 | 1/2008 | Zhu et al. |
| 2008/0028453 A1 | 1/2008 | Nguyen et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0072054 A1 | 3/2008 | Choi |
| 2008/0086759 A1 | 4/2008 | Colson |
| 2008/0134311 A1 | 6/2008 | Medvinsky et al. |
| 2008/0141339 A1 | 6/2008 | Gomez et al. |
| 2008/0172725 A1 | 7/2008 | Fujii et al. |
| 2008/0184351 A1 | 7/2008 | Gephart et al. |
| 2008/0189212 A1* | 8/2008 | Kulakowski .......... H04L 9/3271 705/50 |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0289020 A1 | 11/2008 | Cameron et al. |
| 2008/0313719 A1 | 12/2008 | Kaliski, Jr. et al. |
| 2008/0320308 A1 | 12/2008 | Kostiainen et al. |
| 2009/0025084 A1* | 1/2009 | Siourthas .................. G06Q 20/04 726/25 |
| 2009/0049510 A1 | 2/2009 | Zhang et al. |
| 2009/0055322 A1* | 2/2009 | Bykov .................. G06Q 20/108 705/64 |
| 2009/0064292 A1 | 3/2009 | Carter et al. |
| 2009/0083850 A1 | 3/2009 | Fadell et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0119221 A1 | 5/2009 | Weston et al. |
| 2009/0133113 A1 | 5/2009 | Schneider |
| 2009/0138724 A1 | 5/2009 | Chiou et al. |
| 2009/0138727 A1 | 5/2009 | Campello |
| 2009/0158425 A1 | 6/2009 | Chan et al. |
| 2009/0164797 A1* | 6/2009 | Kramer .................. G06F 21/32 713/186 |
| 2009/0183003 A1 | 7/2009 | Haverinen |
| 2009/0187988 A1 | 7/2009 | Hulten et al. |
| 2009/0193508 A1 | 7/2009 | Brenneman et al. |
| 2009/0196418 A1 | 8/2009 | Tkacik et al. |
| 2009/0199264 A1* | 8/2009 | Lang .................. G06F 21/31 726/1 |
| 2009/0204964 A1 | 8/2009 | Foley et al. |
| 2009/0235339 A1 | 9/2009 | Mennes et al. |
| 2009/0240624 A1* | 9/2009 | James .................. G06Q 20/12 705/44 |
| 2009/0245507 A1 | 10/2009 | Vuillaume et al. |
| 2009/0271618 A1 | 10/2009 | Camenisch et al. |
| 2009/0271635 A1 | 10/2009 | Liu et al. |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0327131 A1 | 12/2009 | Beenau et al. |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0242102 A1 | 2/2010 | Cross et al. |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1* | 5/2010 | Weller .................. G06F 21/31 705/44 |
| 2010/0121855 A1* | 5/2010 | Dalia .................. G06F 3/0644 707/741 |
| 2010/0169650 A1 | 7/2010 | Brickell et al. |
| 2010/0175116 A1 | 7/2010 | Gum |
| 2010/0186072 A1 | 7/2010 | Kumar |
| 2010/0191612 A1 | 7/2010 | Raleigh |
| 2010/0192209 A1* | 7/2010 | Steeves .................. G06F 21/316 726/7 |
| 2010/0205658 A1 | 8/2010 | Griffin |
| 2010/0211792 A1 | 8/2010 | Ureche et al. |
| 2010/0223663 A1 | 9/2010 | Morimoto et al. |
| 2010/0242088 A1 | 9/2010 | Thomas |
| 2010/0266128 A1 | 10/2010 | Asokan et al. |
| 2010/0274677 A1 | 10/2010 | Florek et al. |
| 2010/0287369 A1 | 11/2010 | Monden |
| 2010/0299265 A1 | 11/2010 | Walters et al. |
| 2010/0299738 A1 | 11/2010 | Wahl |
| 2010/0325427 A1 | 12/2010 | Ekberg et al. |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004918 A1 | 1/2011 | Chow et al. |
| 2011/0004933 A1 | 1/2011 | Dickinson et al. |
| 2011/0022835 A1 | 1/2011 | Schibuk |
| 2011/0047608 A1* | 2/2011 | Levenberg .......... H04L 63/0807 726/7 |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0093942 A1 | 4/2011 | Koster et al. |
| 2011/0099361 A1 | 4/2011 | Shah et al. |
| 2011/0107087 A1 | 5/2011 | Lee et al. |
| 2011/0138450 A1 | 6/2011 | Kesanupalli et al. |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0184838 A1* | 7/2011 | Winters .................. G06Q 20/10 705/27.1 |
| 2011/0191200 A1* | 8/2011 | Bayer .................. G06Q 20/12 705/26.1 |
| 2011/0197267 A1 | 8/2011 | Gravel et al. |
| 2011/0219427 A1 | 9/2011 | Hito et al. |

(56) References Cited

U.S. PATENT DOCUMENTS

| | | |
|---|---|---|
| 2011/0225431 A1 | 9/2011 | Stufflebeam, Jr. et al. |
| 2011/0225643 A1 | 9/2011 | Faynberg et al. |
| 2011/0228330 A1 | 9/2011 | Nogawa |
| 2011/0231911 A1* | 9/2011 | White .................. G06F 21/32 726/7 |
| 2011/0246766 A1 | 10/2011 | Orsini et al. |
| 2011/0265159 A1 | 10/2011 | Ronda et al. |
| 2011/0279228 A1 | 11/2011 | Kumar et al. |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023567 A1* | 1/2012 | Hammad .................. G06Q 20/12 726/9 |
| 2012/0023568 A1 | 1/2012 | Cha et al. |
| 2012/0030083 A1* | 2/2012 | Newman .................. G06Q 40/00 705/35 |
| 2012/0046012 A1 | 2/2012 | Forutanpour et al. |
| 2012/0047555 A1 | 2/2012 | Xiao et al. |
| 2012/0066757 A1 | 3/2012 | Vysogorets et al. |
| 2012/0075062 A1 | 3/2012 | Osman et al. |
| 2012/0084566 A1 | 4/2012 | Chin et al. |
| 2012/0084850 A1 | 4/2012 | Novak et al. |
| 2012/0102553 A1* | 4/2012 | Hsueh .................. H04L 9/3234 726/6 |
| 2012/0124639 A1 | 5/2012 | Shaikh et al. |
| 2012/0124651 A1 | 5/2012 | Ganesan et al. |
| 2012/0130898 A1* | 5/2012 | Snyder .................. G06Q 20/32 705/44 |
| 2012/0137137 A1 | 5/2012 | Brickell et al. |
| 2012/0144461 A1* | 6/2012 | Rathbun .................. H04L 9/3213 726/5 |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0239950 A1 | 9/2012 | Davis et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2012/0323717 A1* | 12/2012 | Kirsch .................. G06Q 20/0855 705/26.1 |
| 2013/0013931 A1* | 1/2013 | O'Hare .................. H04L 9/0822 713/189 |
| 2013/0042115 A1 | 2/2013 | Sweet et al. |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0047200 A1* | 2/2013 | Radhakrishnan ....... G06F 21/34 726/1 |
| 2013/0054336 A1 | 2/2013 | Graylin |
| 2013/0054967 A1 | 2/2013 | Davoust et al. |
| 2013/0055370 A1 | 2/2013 | Goldberg et al. |
| 2013/0061055 A1 | 3/2013 | Schibuk |
| 2013/0067546 A1* | 3/2013 | Thavasi .................. G06F 21/31 726/7 |
| 2013/0073859 A1 | 3/2013 | Carlson et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1* | 5/2013 | Davis .................. G06F 21/316 726/7 |
| 2013/0144785 A1* | 6/2013 | Karpenko ............ G06Q 20/409 705/44 |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0160100 A1* | 6/2013 | Langley .................. H04L 63/126 726/7 |
| 2013/0167196 A1 | 6/2013 | Spencer et al. |
| 2013/0191884 A1 | 7/2013 | Leicher et al. |
| 2013/0212637 A1 | 8/2013 | Guccione et al. |
| 2013/0219456 A1 | 8/2013 | Sharma et al. |
| 2013/0227646 A1 | 8/2013 | Haggerty et al. |
| 2013/0239173 A1* | 9/2013 | Dispensa .................. G06F 21/35 726/2 |
| 2013/0246272 A1 | 9/2013 | Kirsch et al. |
| 2013/0262305 A1* | 10/2013 | Jones .................. H04B 5/0031 705/44 |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0326215 A1 | 12/2013 | Leggette et al. |
| 2013/0337777 A1 | 12/2013 | Deutsch et al. |
| 2013/0346176 A1 | 12/2013 | Alolabi et al. |
| 2013/0347064 A1 | 12/2013 | Aissi et al. |
| 2014/0002238 A1 | 1/2014 | Taveau et al. |
| 2014/0006776 A1 | 1/2014 | Scott-Nash et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0037092 A1 | 2/2014 | Bhattacharya et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075516 A1 | 3/2014 | Chermside |
| 2014/0089243 A1 | 3/2014 | Oppenheimer |
| 2014/0090039 A1 | 3/2014 | Bhow |
| 2014/0090088 A1 | 3/2014 | Bjones et al. |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0114857 A1 | 4/2014 | Griggs et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1* | 6/2014 | Barbir .................. H04L 63/0815 726/28 |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1* | 7/2014 | Umerley .................. G06F 21/40 726/7 |
| 2014/0201809 A1 | 7/2014 | Choyi et al. |
| 2014/0230032 A1* | 8/2014 | Duncan .................. G06F 21/32 726/7 |
| 2014/0245391 A1* | 8/2014 | Adenuga .................. G06F 21/34 726/3 |
| 2014/0250011 A1* | 9/2014 | Weber .................. G06Q 20/4016 705/44 |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0279516 A1* | 9/2014 | Rellas .................. G06Q 30/0185 705/44 |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |

(56) References Cited

U.S. PATENT DOCUMENTS

| | | |
|---|---|---|
| 2014/0289116 A1* | 9/2014 | Polivanyi .............. G06Q 20/42 705/44 |
| 2014/0289117 A1* | 9/2014 | Baghdasaryan ....... G06Q 20/42 705/44 |
| 2014/0289820 A1* | 9/2014 | Lindemann ............ G06Q 20/42 726/5 |
| 2014/0289821 A1 | 9/2014 | Wilson |
| 2014/0289833 A1* | 9/2014 | Briceno ................. H04L 63/08 726/7 |
| 2014/0289834 A1* | 9/2014 | Lindemann ............ G06Q 20/42 726/7 |
| 2014/0298419 A1 | 10/2014 | Boubez et al. |
| 2014/0304505 A1 | 10/2014 | Dawson |
| 2014/0325239 A1 | 10/2014 | Ghose |
| 2014/0333413 A1* | 11/2014 | Kursun ............... G06K 9/00892 340/5.52 |
| 2014/0335824 A1 | 11/2014 | Abraham |
| 2014/0337948 A1 | 11/2014 | Hoyos |
| 2015/0019220 A1 | 1/2015 | Talhami et al. |
| 2015/0046340 A1* | 2/2015 | Dimmick ............... G06Q 20/40 705/72 |
| 2015/0058931 A1 | 2/2015 | Miu et al. |
| 2015/0095999 A1 | 4/2015 | Toth et al. |
| 2015/0096002 A1* | 4/2015 | Shuart ..................... G06F 21/32 726/7 |
| 2015/0121068 A1 | 4/2015 | Lindemann et al. |
| 2015/0134330 A1 | 5/2015 | Baldwin et al. |
| 2015/0142628 A1* | 5/2015 | Suplee .................. G06Q 40/02 705/35 |
| 2015/0180869 A1 | 6/2015 | Verma |
| 2015/0193781 A1* | 7/2015 | Dave .................. G06Q 30/0185 705/318 |
| 2015/0242605 A1 | 8/2015 | Du et al. |
| 2015/0244525 A1 | 8/2015 | McCusker et al. |
| 2015/0244696 A1 | 8/2015 | Ma |
| 2015/0269050 A1 | 9/2015 | Filimonov et al. |
| 2015/0326529 A1 | 11/2015 | Morita |
| 2015/0373039 A1* | 12/2015 | Wang .................. H04L 63/1425 726/23 |
| 2015/0381580 A1 | 12/2015 | Graham, III et al. |
| 2016/0034892 A1* | 2/2016 | Carpenter ............. G06Q 20/40 705/44 |
| 2016/0036588 A1 | 2/2016 | Thackston |
| 2016/0071105 A1* | 3/2016 | Groarke ................. G06Q 50/01 705/44 |
| 2016/0072787 A1 | 3/2016 | Balabine et al. |
| 2016/0078869 A1 | 3/2016 | Syrdal et al. |
| 2016/0087952 A1* | 3/2016 | Tartz ..................... H04L 63/08 455/411 |
| 2016/0087957 A1 | 3/2016 | Shah et al. |
| 2016/0134421 A1 | 5/2016 | Chen et al. |
| 2016/0188958 A1 | 6/2016 | Martin |
| 2016/0292687 A1* | 10/2016 | Kruglick ............... G06Q 20/12 |
| 2017/0004487 A1* | 1/2017 | Hagen ................. G06Q 20/3224 |
| 2017/0011406 A1* | 1/2017 | Tunnell ............. G06Q 20/40145 |
| 2017/0048070 A1 | 2/2017 | Gulati et al. |
| 2017/0085587 A1* | 3/2017 | Turgeman ........... G06F 3/03547 |
| 2017/0109751 A1 | 4/2017 | Dunkelberger et al. |
| 2017/0195121 A1 | 7/2017 | Frei et al. |
| 2017/0221068 A1* | 8/2017 | Krauss ............... G06Q 20/4037 |
| 2017/0317833 A1 | 11/2017 | Smith et al. |
| 2017/0330174 A1 | 11/2017 | Demarinis et al. |
| 2017/0330180 A1 | 11/2017 | Song et al. |
| 2017/0331632 A1 | 11/2017 | Leoutsarakos et al. |
| 2017/0352116 A1 | 12/2017 | Pierce et al. |
| 2018/0039990 A1* | 2/2018 | Lindemann ............ G06F 21/31 |
| 2018/0191501 A1* | 7/2018 | Lindemann ........... H04L 9/3231 |
| 2018/0191695 A1* | 7/2018 | Lindemann ......... H04L 63/0853 |
| 2019/0139005 A1* | 5/2019 | Piel .................... G06Q 20/405 |
| 2019/0164156 A1* | 5/2019 | Lindemann ........... H04L 9/0877 |
| 2019/0205885 A1* | 7/2019 | Lim ...................... G06N 5/003 |
| 2019/0222424 A1* | 7/2019 | Lindemann ......... H04L 63/0861 |
| 2019/0251234 A1* | 8/2019 | Liu ..................... G06Q 20/385 |

FOREIGN PATENT DOCUMENTS

| | | |
|---|---|---|
| CN | 101495956 A | 7/2009 |
| CN | 102077546 A | 5/2011 |
| CN | 102246455 A | 11/2011 |
| CN | 102404116 A | 4/2012 |
| CN | 102713922 A | 10/2012 |
| CN | 102763111 A | 10/2012 |
| CN | 103888252 A | 6/2014 |
| CN | 103945374 A | 7/2014 |
| CN | 103999401 A | 8/2014 |
| EP | 1376302 A2 | 1/2004 |
| EP | 2357754 A1 | 8/2011 |
| JP | 06-195307 A | 7/1994 |
| JP | 09-231172 A | 9/1997 |
| JP | 2001-325469 A | 11/2001 |
| JP | 2002152189 A | 5/2002 |
| JP | 2003143136 A | 5/2003 |
| JP | 2003-219473 A | 7/2003 |
| JP | 2003-223235 A | 8/2003 |
| JP | 2003-274007 A | 9/2003 |
| JP | 2003-318894 A | 11/2003 |
| JP | 2004-118456 A | 4/2004 |
| JP | 2004348308 A | 12/2004 |
| JP | 2005-092614 A | 4/2005 |
| JP | 2005-316936 A | 11/2005 |
| JP | 2006-144421 A | 6/2006 |
| JP | 2007-148470 A | 6/2007 |
| JP | 2007220075 A | 8/2007 |
| JP | 2007-249726 A | 9/2007 |
| JP | 2008-017301 A | 1/2008 |
| JP | 2008065844 A | 3/2008 |
| JP | 2009-223452 A | 10/2009 |
| JP | 2010-015263 A | 1/2010 |
| JP | 2010-505286 A | 2/2010 |
| JP | 2012-503243 A | 2/2012 |
| JP | 2013016070 A | 1/2013 |
| JP | 2013-122736 A | 6/2013 |
| JP | 2013-522722 A | 6/2013 |
| TW | 200701120 A | 1/2007 |
| TW | 201121280 A | 6/2011 |
| WO | 03017159 A1 | 2/2003 |
| WO | 2005003985 A1 | 1/2005 |
| WO | 2007023756 A1 | 3/2007 |
| WO | 2007/094165 A1 | 8/2007 |
| WO | 2009158530 A2 | 12/2009 |
| WO | 2010/032216 A1 | 3/2010 |
| WO | 2010067433 A1 | 6/2010 |
| WO | 2013082190 A1 | 6/2013 |
| WO | 2014/011997 A1 | 1/2014 |
| WO | 2014105994 A2 | 7/2014 |
| WO | 2015130734 A1 | 9/2015 |
| WO | 2017/219007 A1 | 12/2017 |

OTHER PUBLICATIONS

Advisory Action from U.S. Appl. No. 13/730,791 dated Jan. 23, 2015, 4 pages.

Akhtar Z., et al., "Spoof Attacks on Multimodal Biometric Systems", International Conference on Information and Network Technology, 2011, vol. 4, pp. 46-51.

Bao, W., et al., "A liveness detection method for face recognition based on optical flow field", 2009, pp. 233-236, http://ieeexplore.ieee.org/stamp/stamp.jsp?tp=&arnumber=5054589&isnumber=5054562.

Barker E., et al., "Recommendation for key management Part 3: Application—Specific Key Management Guidance", NIST Special Publication 800-57, 2009, pp. 1-103.

BehavioSec, "Measuring FAR/FRR/EER in Continuous Authentication," Stockholm, Sweden (2009), 8 pages.

Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.

Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359- 0/11.

(56) References Cited

OTHER PUBLICATIONS

Chen L., et al., "Flexible and scalable digital signatures in TPM 2.0." Proceedings of the 2013 ACM SIGSAC conference on Computer & communications security. ACM, 2013, 12 pages.
Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Continuous User Authentication Using Temporal Information, http://www.cse.msu.edu/biometrics/Publications/Face/NiinumaJain_ContinuousAuth_SPIE10.pdf, 11 pages.
Crazy Egg Heatmap Shows Where People Click on Your Website, 2012, 3 pages, www.michaelhartzell.com/Blog/bid/92970/Crazy-Egg-Heatmap-shows-where-people-click-on-your-website).
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Delac K. et al., Eds., InTech, Jun. 1, 2008, Retrieved from the Internet:, ISBN 978-953-7619-34-3, Uploaded as individual Chapters 1-15, 15 pages.
Doherty, et al., Internet Engineering Task Force (IETF), "Dynamic Symmetric Key Provisioning Protocol (DSKPP)", Dec. 2010, 105 pages.
Edited by Kresimir Delac, Mislay Grgic and Marian Stewart Bartlett. s.l. : InTech Jun. 1, 2008. http://cdn.intechopen.com/finals/81/InTech-Recent_advances_in_face_recognition.zip. ISBN 978-953-7619-34-3. Uploaded as Chapters 1-15.
Extended European Search Report for Application No. 13867269, dated Nov. 4, 2016, 10 pages.
Extended European Search Report for Application No. 14803988.6, dated Dec. 23, 2016, 10 pages.
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/066,273 dated Feb. 11, 2016, 29 pages.
Final Office Action from U.S. Appl. No. 14/066,384 dated Aug. 20, 2015, 23 pages.
Final Office Action from U.S. Appl. No. 14/218,551 dated Sep. 9, 2015, 15 pages.
Final Office Action from U.S. Appl. No. 14/218,551 dated Sep. 16, 2016, 11 pages.
Final Office Action from U.S. Appl. No. 14/218,575 dated Aug. 7, 2015, 19 pages.
Final Office Action from U.S. Appl. No. 14/218,575 dated Jul. 7, 2016, 29 pages.
Final Office Action from U.S. Appl. No. 14/218,646 dated Aug. 11, 2016, 25 pages.
Final Office Action from U.S. Appl. No. 14/218,692 dated Mar. 2, 2016, 24 pages.
Final Office Action from U.S. Appl. No. 14/268,619 dated Dec. 14, 2015, 10 pages.
Final Office Action from U.S. Appl. No. 14/268,733 dated Jan. 15, 2016, 14 pages.
Final Office Action from U.S. Appl. No. 14/448,814 dated Feb. 16, 2016, 14 pages.
Final Office Action from U.S. Appl. No. 14/448,814 dated Jun. 14, 2016, 17 pages.
Final Office Action from U.S. Appl. No. 14/448,868 dated Aug. 19, 2016, 11 pages.
Grother, P.J., et al., NIST. Report on the Evaluation of 2D Still-Image Face Recognition Algorithms, NIST IR 7709. s.l, NIST, 2011, Jun. 22, 2010, pp. 1-58.
GSM Arena. [Online] Nov. 13, 2011, [Cited: Sep. 29, 2012.], 2 pages, [retrieved on Aug. 18, 2015]. Retrieved from the Internet: URL: http://www.gsmarena.com/ice_cream_sandwichs_face_unlock_duped_using_a_photograph-news-3377.php.
Heikkila M., et al., "A Texture-Based Method for Modeling the Background and Detecting Moving Objects", Oulu : IEEE , Jun. 22, 2005, DRAFT, Retrieved from the Internet: URL: , 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/UREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-fina139.pdf.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
International Search Report and Written Opinion for Application No. PCT/US2015/028924 dated Jul. 30, 2015, 10 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Requirement for Restriction/Election from U.S. Appl. No. 14/218,504 dated Aug. 16, 2016, 11 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverviewEUSIPC004.pdf.
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz et al., "Face Spoofing Detection Through Partial Least Squares and Low-Level Descriptors," International Conference on Biometrics, 2011, vol. 2011, pp. 1-8.

(56) References Cited

OTHER PUBLICATIONS

Smiatacz M., et al., Gdansk University of Technology. Liveness Measurements Using Optical Flow for Biometric Person Authentication. Metrology and Measurement Systems. 2012, vol. XIX, 2. pp. 257-268.
Supplementary Partial European Search Report for Application No. 13867269, dated Aug. 3, 2016, 7 pages.
T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan et al., "Face Liveness Detection from a Single Image with Sparse Low Rank Bilinear Discriminative Model," European Conference on Computer Vision, 2010, vol. 2010, pp. 1-14.
The Extended M2VTS Database, [retrieved on Sep. 29, 2012], Retrieved from the Internet: URL: http://www.ee.surrey.ac.uk/CVSSP/xm2vtsdb/, 1 page.
The Online Certificate Status Protocol, OCSP, RFC2560, 22 pages.
The source for Linux information, Linux.com, [online], [retrieved on Jan. 28, 2015], 2012, 3 pages.
Transmittal of International Preliminary Report on Patentability for Patent Application No. PCT/US2013/077888 dated Jul. 9, 2015, 7 pages.
Transmittal of International Preliminary Report on Patentability from foreign counterpart PCT Patent Application No. PCT/US2014/031344 dated Oct. 1, 2015, 9 pages.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadern_PervComp2012draft.pdf.
Tronci R., et al., "Fusion of Multiple Clues for Photo-Attack Detection in Face Recognition Systems," International Joint Conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Validity, OSTP Framework, 24 pages, 2010.
Vassilev, A.T.; du Castel, B.; Ali, A.M., "Personal Brokerage of Web Service Access," Security & Privacy, IEEE, vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How to Trick Google's New Face Unlock on Android 4.1 Jelly Bean," Aug. 6, 2012, 5 pages, [online], [retrieved Aug. 13, 2015]. Retrieved from the Internet: .
World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/145,439 dated Jul. 6, 2015, 6 pages.
Notice of Allowance from U.S. Appl. No. 14/145,439 dated Mar. 14, 2016, 17 pages.
Notice of Allowance from U.S. Appl. No. 14/145,439 dated Oct. 28, 2015, 12 pages.
Notice of Allowance from U.S. Appl. No. 14/145,533 dated Jan. 20, 2016, 12 pages.
Notice of Allowance from U.S. Appl. No. 14/145,533 dated May 11, 2015, 5 pages.
Notice of Allowance from U.S. Appl. No. 14/145,533 dated Sep. 14, 2015, 13 pages.
Notice of Allowance from U.S. Appl. No. 14/145,607 dated Feb. 1, 2016, 28 pages.
Notice of Allowance from U.S. Appl. No. 14/145,607 dated Sep. 2, 2015, 19 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,686 dated Mar. 30, 2016, 38 pages.
Notice of Allowance from U.S. Appl. No. 14/268,686 dated Nov. 5, 2015, 23 pages.
Notice of Allowance from U.S. Appl. No. 14/268,733 dated Sep. 23, 2016, 8 pages.
Notice of Allowance from U.S. Appl. No. 14/448,641 dated Jun. 7, 2016, 13 pages.
Notice of Allowance from U.S. Appl. No. 14/448,697 dated Jan. 14, 2016, 23 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/448,697 dated Sep. 15, 2015, 14 pages.
Notice of Allowance from U.S. Appl. No. 14/487,992 dated Dec. 27, 2016, 28 pages.
Notice of Allowance from U.S. Appl. No. 14/487,992 dated Sep. 6, 2016, 26 pages.
Notification Concerning Transmittal of International Preliminary Report on Patentability for Application No. PCT/US14/39627, dated Dec. 10, 2015, 8 pages.
Notification of Transmittal of the International Search Report and the Written Opinion from counterpart Patent Cooperation Treaty Application No. PCT/US13/77888, dated Aug. 4, 2014, 10 pages.
Notification of Transmittal of the International Search Report and the Written Opinion from counterpart Patent Cooperation Treaty Application No. PCT/US14/31344, dated Nov. 3, 2014, 16 pages.
Notification of Transmittal of the International Search Report and the Written Opinion from counterpart Patent Cooperation Treaty Application No. PCT/US14/39627, dated Oct. 16, 2014, 10 pages.
Notification of Transmittal of the International Search Report and the Written Opinion from counterpart Patent Cooperation Treaty Application No. PCT/US15/50348, dated Dec. 22, 2015, 9 pages.
Notification of Transmittal of the International Search Report and the Written Opinion from counterpart Patent Cooperation Treaty Application No. PCT/US2015/042786, dated Oct. 16, 2015, 8 pages.

(56) References Cited

OTHER PUBLICATIONS

Notification of Transmittal of the International Search Report and the Written Opinion from counterpart Patent Cooperation Treaty Application No. PCT/US2015/042799, dated Oct. 16, 2015, 3 pages.
Notification of Transmittal of the International Search Report and the Written Opinion from counterpart Patent Cooperation Treaty Application No. PCT/US2015/042870, dated Oct. 30, 2015, 9 pages.
Notification of Transmittal of the International Search Report and the Written Opinion from counterpart Patent Cooperation Treaty Application No. PCT/US2015/42783, dated Oct. 19, 2015, 13 pages.
Notification of Transmittal of the International Search Report and the Written Opinion from counterpart Patent Cooperation Treaty Application No. PCT/US2015/42827, dated Oct. 30, 2015, 9 pages.
Notification of Transmittal or International Search Report and Written Opinion from PCT/US2015/028927, dated Jul. 30, 2015, 12 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 653.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio-and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Lubin, G., et al. "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.

Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition-Livdet 2009," Image Analysis and Processing-ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Non-Final Office Action from U.S. Appl. No. 13/730,761 dated Feb. 27, 2014, 24 pages.
Non-Final Office Action from U.S. Appl. No. 13/730,761 dated Sep. 9, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/066,273 dated Jun. 16, 2016, 43 pages.
Non-Final Office Action from U.S. Appl. No. 14/066,273 dated May 8, 2015, 31 pages.
Non-Final Office Action from U.S. Appl. No. 14/066,384 dated Jan. 7, 2015, 24 pages.
Non-Final Office Action from U.S. Appl. No. 14/066,384 dated Mar. 17, 2016, 40 pages.
Non-Final Office Action from U.S. Appl. No. 14/145,439 dated Feb. 12, 2015, 18 pages.
Non-Final Office Action from U.S. Appl. No. 14/145,533 dated Jan. 26, 2015, 13 pages.
Non-Final Office, Action from U.S. Appl. No. 14/145,607 dated Mar. 20, 2015, 22 pages.
Non-Final Office Action from U.S. Appl. No. 14/218,551 dated Apr. 23, 2015, 9 pages.
Non-Final Office Action from U.S. Appl. No. 14/218,551 dated Jan. 21, 2016, 11 pages.
Non-Final Office Action from U.S. Appl. No. 14/218,551 dated May 12, 2016, 11 pages.
Non-Final Office Action from U.S. Appl. No. 14/218,575 dated Feb. 10, 2015, 17 pages.
Non-Final Office Action from U.S. Appl. No. 14/218,575 dated Jan. 29, 2016, 25 pages.
Non-Final Office Action from U.S. Appl. No. 14/218,611 dated Jun. 16, 2016, 13 pages.
Non-Final Office Action from U.S. Appl. No. 14/218,646 dated Mar. 10, 2016, 23 pages.
Non-Final Office Action from U.S. Appl. No. 14/218,677 dated Aug. 2, 2016, 15 pages.
Non-Final Office Action from U.S. Appl. No. 14/218,692 dated Nov. 34, 2015, 16 pages.
Non-Final Office Action from U.S. Appl. No. 14/218,692 dated Oct. 25, 2016, 33 pages.
Non-Final Office Action from U.S. Appl. No. 14/218,743 dated Aug. 19, 2016, 11 pages.

(56) References Cited

OTHER PUBLICATIONS

Non-Final Office Action from U.S. Appl. No. 14/218,743 dated Jan. 21, 2016, 12 pages.
Non-Final Office Action from U.S. Appl. No. 14/268,619 dated Aug. 24, 2015, 17 pages.
Non-Final Office Action from U.S. Appl. No. 14/268,619 dated Mar. 21, 2016, 7 pages.
Non-Final Office Action from U.S. Appl. No. 14/268,733 dated Jul. 16, 2015, 13 pages.
Non-Final Office Action from U.S. Appl. No. 14/448,641 dated Nov. 9, 2015, 21 pages.
Non-Final Office Action from U.S. Appl. No. 14/448,747 dated Aug. 19, 2016, 21 pages.
Non-Final Office Action from U.S. Appl. No. 14/448,814 dated Aug. 4, 2015, 13 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328 dated Sep. 15, 2016, 39 pages.
Notice of Allowance from U.S. Appl. No. 14/487,992 dated May 12, 2016, 11 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.
Communication pursuant to Rules 161(2) and 162 EPC for EP Application No. 15826364.0, dated Mar. 7, 2017, 2 pages.
Extended European Search Report from European Patent Application No. 14770682.4, dated Jan. 17, 2017, 14 pages.
Final Office Action from U.S. Appl. No. 14/066,273, dated Jan. 10, 2017, 24 pages.
Final Office Action from U.S. Appl. No. 14/218,611, dated Jan. 27, 2017, 14 pages.
Final Office Action from U.S. Appl. No. 14/218,692, dated Feb. 28, 2017, 27 pages.
Final Office Action from U.S. Appl. No. 14/218,743, dated Mar. 3, 2017, 67 pages.
Final Office Action from U.S. Appl. No. 14/448,747, dated Feb. 13, 2017, 74 pages.
Final Office Action from U.S. Appl. No. 14/859,328, dated Mar. 6, 2017, 26 pages.
Kim et al., "Secure User Authentication based on the Trusted Platform for Mobile Devices," EURASIP Journal on Wireless Communications and Networking, pp. 1-15.
Non-Final Office Action from U.S. Appl. No. 14/066,273 dated May 18, 2017, 46 pages.
Non-Final Office Action from U.S. Appl. No. 14/218,504, dated Feb. 27, 2017, 12 pages.
Non-Final Office Action from U.S. Appl. No. 14/218,575, dated May 4, 2017, 88 pages.
Non-Final Office Action from U.S. Appl. No. 14/218,646, dated Mar. 27, 2017, 24 pages.
Non-Final Office Action from U.S. Appl. No. 14/218,677, dated Feb. 10, 2017, 18 pages.
Non-final Office Action from U.S. Appl. No. 14/268,563, dated Apr. 21, 2017, 83 pages.
Non-Final Office Action from U.S. Appl. No. 14/448,814, dated Apr. 5, 2017, 57 pages.
Notice of Allowance from U.S. Appl. No. 14/066,384, dated May 23, 2017, 50 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,733, dated Jan. 20, 2017, 62 pages.
Notice of Allowance from U.S. Appl. No. 14/448,868, dated Apr. 27, 2017, 52 pages.
Notice of Allowance from U.S. Appl. No. 14/448,868, dated Mar. 23, 2017, 57 pages.
Notice of Allowance from U.S. Appl. No. 14/487,992, dated Apr. 12, 2017, 14 pages.
Office Action from foreign counterpart Taiwan Patent Application No. 102148853, dated Feb. 17, 2017, 9 pages.
Partial Supplementary European Search Report from European Patent Application No. 14770682.4, dated Oct. 14, 2016, 8 pages.
TechTarget, What is network perimeter? Definition from WhatIs.com downloaded from http://searchnetworking.techtarget.com/definition/network-perimeter dated Apr. 14, 2017, 5 pages.
Extended European Search Report for Application No. 15786487.7, dated Oct. 23, 2017, 8 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/268,563, dated Nov. 3, 2017, 46 pages.
Final Office Action from U.S. Appl. No. 14/448,814 dated Oct. 6, 2017, 24 pages.
First Office Action and Search Report from foreign counterpart China Patent Application No. 201380068869.3, dated Sep. 19, 2017, 17 pages.
First Office Action and Search Report from foreign counterpart China Patent Application No. 201480025959.9, dated Jul. 7, 2017, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
International Search Report and Written Opinion for Application No. PCT/US2017/045534, dated Nov. 27, 2017, 14 pages.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Martins R A., et al., "A Potpourri of Authentication Mechanisms the Mobile Device Way," CISTI, Jan. 2013, pp. 343-848.
Non-Final Office Action from U.S. Appl. No. 14/218,611, dated Sep. 19, 2017, 76 pages.
Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/859,328, dated Jul. 14, 2017, 29 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 09 pages.

(56) References Cited

OTHER PUBLICATIONS

Notice of Allowance from U.S. Appl. No. 14/066,384, dated Dec. 1, 2017, 23 pages.
Notice of Allowance from U.S. Appl. No. 14/066,384, dated Jul. 26, 2017, 20 pages.
Notice of Allowance from U.S. Appl. No. 14/218,551, dated Aug. 16, 2017, 24 pages.
Notice of Allowance from U.S. Appl. No. 14/218,551, dated Dec. 13, 2017, 13 pages.
Notice of Allowance from U.S. Appl. No. 14/448,747, dated Jun. 20, 2017, 14 pages.
Notice of Allowance from U.S. Appl. No. 14/448,868, dated Jun. 26, 2017, 14 pages.
Notice of Allowance from U.S. Appl. No. 14/448,868, dated Nov. 17, 2017, 15 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Office Action and Search Report from foreign counterpart Chinese Patent Application No. 201480031042.X, dated Dec. 4, 2017, 20 pages.
Starnberger G., et al., "QR-TAN: Secure Mobile Transaction Authentication," Availability, Reliability and Security, 2009, ARES'09, International Conference on IEEE, Mar. 16, 2009, pp. 578-585.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.
Chen L., "Direct Anonymous Attestation," Oct. 12, 2005, retrieved from https://trustedcomputinggroup.org/wp-content/uploads/051012_DAA-slides.pdf on Apr. 2, 2018, 27 pages.
Communication pursuant to Rules 70(2) and 70a(2) EPC for Application No. 15827363.7, dated Mar. 13, 2018, 1 page.
Communication pursuant to Rules 70(2) and 70a(2) EPC for European Application No. 15786487.7, dated Nov. 9, 2017, 1 page.
Corrected Notice of Allowance from U.S. Appl. No. 14/066,273, dated Feb. 8, 2018, 4 pages.
Decision to Grant from foreign counterpart Japanese Patent Application No. 2015-550778, dated Jul. 25, 2018, 6 pages.
Extended European Search Report for Application No. 15826364.0, dated Feb. 20, 2018, 6 pages.
Extended European Search Report for Application No. 15827363.1, dated Feb. 22, 2018, 7 pages.
Extended European Search Report for Application No. 15828152.7, dated Feb. 20, 2018, 8 pages.
Extended European Search Report for Application No. 15841530.7, dated Mar. 26, 2018, 8 pages.
Final Office Action from U.S. Appl. No. 14/218,677, dated May 31, 2018, 16 pages.
Final Office Action from U.S. Appl. No. 14/218,611, dated May 3, 2018, 20 pages.
Final Office Action from U.S. Appl. No. 14/218,692, dated Apr. 17, 2018, 99 pages.
Final Office Action from U.S. Appl. No. 14/218,743, dated Feb. 7, 2018, 27 pages.
Final Office Action from U.S. Appl. No. 15/396,452, dated Feb. 27, 2018, 24 pages.
Final Office Action from U.S. Appl. No. 15/595,460, dated Jan. 11, 2018, 19 pages.
Monden A., et al., "Remote Authentication Protocol," Multimedia, Distributed, Cooperative and Mobile Symposium (DICOM02007), Information Processing Society of Japan, Jun. 29, 2007, pp. 1322-1331.
Non-Final Office Action from U.S. Appl. No. 14/218,692, dated Jul. 31, 2018, 40 pages.
Non-Final Office Action from U.S. Appl. No. 14/268,563, dated Jun. 28, 2018, 56 pages.
Non-Final Office Action from U.S. Appl. No. 15/881,522, dated Jun. 6, 2018, 87 pages.
Non-Final Office Action from U.S. Appl. No. 14/218,575, dated Mar. 8, 2018, 29 pages.
Non-Final Office Action from U.S. Appl. No. 14/218,646, dated Mar. 7, 2018, 32 pages.
Non-Final Office Action from U.S. Appl. No. 14/218,677, dated Feb. 32, 2018, 25 pages.
Non-Final Office Action from U.S. Appl. No. 15/229,254, dated Feb. 14, 2018, 75 pages.
Non-Final Office action from U.S. Appl. No. 15/595,460, dated May 3, 2018, 20 pages.
Notice of Allowance from foreign counterpart Taiwan Patent Application No. 106125986, dated Jul. 6, 2018, 7 pages.
Notice of Allowance from U.S. Appl. No. 14/218,743, dated Aug. 1, 2018, 18 pages.
Notice of Allowance from U.S. Appl. No. 14/448,814, dated May 9, 2018, 12 pages.
Notice of Allowance from U.S. Appl. No. 15/396,452, dated Jul. 2, 2018, 23 pages.
Notice of Allowance from U.S. Appl. No. 14/066,273, dated Jan. 18, 2018, 26 pages.
Notice of Allowance from U.S. Appl. No. 14/218,504, dated May 31, 2018, 95 pages.
Notice of Allowance from U.S. Appl. No. 14/859,328, dated Feb. 1, 2018, 18 pages.
Notification for Granting Patent Right and Search Report from foreign counterpart Chinese Patent Application No. 201380068869.3, dated May 4, 2018, 10 pages.
Notification of Reason for Rejection from foreign counterpart Japanese Patent Application No. 2016-505506, dated Feb. 13, 2018, 6 pages.
Notification of Reasons for Rejection from foreign counterpart Japanese Patent Application No. 2016-0516743, dated Apr. 23, 2018, 12 pages.
Office Action and Search Report from foreign counterpart Taiwan Patent Application No. 106125986, dated Mar. 19, 2018, 6 pages.
Office Action from foreign counterpart Japanese Patent Application No. 2015-550778, dated Feb. 7, 2018, 14 pages.
Watanabe, H., et al., "The Virtual Wearable Computing System Assumed Widely Movement," the multimedia, distribution and cooperation which were taken into consideration, mobile (DICOMO2009) symposium collected-papers [CD-ROM], Japan, Information Processing Society of Japan, Jul. 1, 2009, and vol. 2009 (1), pp. 1406-1414, (only Abstract in English).
Babich A., "Biometric Authentication. Types of Biometric Identifiers," Haaga-Helia, University of Applied Sciences, 2012, retrieved from https://www.theseus.fi/bitstream/handle/10024/44684/Babich_Aleksandra.pdf, 56 pages.
Communication pursuant to Article 94(3) EPC for Application No. 15786796.1, dated Oct. 23, 2018, 4 pages.
Corrected Notice of Allowance from U.S. Appl. No. 15/396,452, dated Aug. 30, 2018, 17 pages.
Corrected Notice of Allowance from U.S. Appl. No. 15/396,454, dated Sep. 28, 2018, 24 pages.
Corrected Notice of Allowance from U.S. Appl. No. 15/595,460, dated Dec. 11, 2018, 70 pages.
Corrected Notice of Allowance from U.S. Appl. No. 15/595,460, dated Nov. 20, 2018, 38 pages.
Final Office Action from U.S. Appl. No. 14/268,563, dated Dec. 27, 2018, 47 pages.
Final Office Action from U.S. Appl. No. 15/229,254, dated Aug. 23, 2018, 16 pages.
Final Office Action from U.S. Appl. No. 14/218,575 dated Sep. 5, 2018, 19 pages.
Final Office Action from U.S. Appl. No. 14/218,646, dated Aug. 9, 2018, 23 pages.
Final Office Action from U.S. Appl. No. 15/881,522, dated Feb. 6, 2019, 21 pages.
Final Office Action from U.S. Appl. No. 15/954,188, dated Feb. 25, 2019, 8 pages.
International Preliminary Report on Patentability for Application No. PCT/US2017/045534, dated Feb. 14, 2019, 11 pages.

(56) References Cited

OTHER PUBLICATIONS

Non-Final Office Action from U.S. Appl. No. 14/218,646, dated Dec. 31, 2018, 42 pages.
Non-Final Office Action from U.S. Appl. No. 14/218,677, dated Dec. 26, 2018, 32 pages.
Non-Final Office Action from U.S. Appl. No. 15/900,620, dated Oct. 19, 2018, 66 pages.
Non-Final Office Action from U.S. Appl. No. 14/218,611, dated Feb. 7, 2019, 27 pages.
Non-Final Office Action from U.S. Appl. No. 15/229,254, dated Feb. 26, 2019, 46 pages.
Non-Final Office Action from U.S. Appl. No. 15/954,188, dated Sep. 7, 2018, 41 pages.
Notice of Allowance from U.S. Appl. No. 15/396,454, dated Jan. 28, 2019, 23 pages.
Notice of Allowance from U.S. Appl. No. 15/396,454, dated Nov. 16, 2018, 34 pages.
Notice of Allowance from foreign counterpart Chinese Patent Application No. 201480031042.X, dated Jul. 23, 2018, 5 pages.
Notice of Allowance from U.S. Appl. No. 14/218,692, dated Dec. 5, 2018, 13 pages.
Notice of Allowance from U.S. Appl. No. 15/396,454, dated Sep. 18, 2018, 79 pages.
Notice of Allowance from U.S. Appl. No. 15/595,460, dated Oct. 9, 2018, 8 pages.
Notice of Allowance from U.S. Appl. No. 15/900,620, dated Feb. 15, 2019, 20 pages.
Notice of Reasons for Rejection from foreign counterpart Japanese Patent Application No. 2017-505513, dated Oct. 22, 2018, 6 pages.
OASIS Standard, "Authentication Context for the OASIS Security Assertion Markup Language (SAML) V2.0," Mar. 15, 2005, 70 pages.
"OpenID Connect Core 1.0—draft 17," Feb. 3, 2014, 70 pages.
Communication pursuant to Article 94(3) EPC, EP App. No. 15786487, dated Feb. 20, 2020, 6 pages.
Intention to Grant a Patent, EP App. No. 15826364.0, dated Feb. 18, 2020, 6 pages.
Office Action, CN App No. 201580049696.X, dated Feb. 6, 2020, 11 pages (5 pages of English Translation and 6 pages of Original Document).
Communication pursuant to Article 94(3) EPC for Application No. 15841530.7, dated Feb. 8, 2019, 4 pages.
Communication pursuant to Article 94(3) EPC, EP App. No. 13867269.6, dated Aug. 30, 2019, 6 pages.
Communication Pursuant to Article 94(3) EPC, EP App. No. 14770682.4, dated Jun. 6, 2019, 5 pages.
Communication pursuant to Article 94(3) EPC, EP App. No. 15786796.1, dated May 31, 2019, 5 pages.
Communication pursuant to Article 94(3) EPC, EP App. No. 15826660.1, dated Jul. 4, 2019, 6 pages.
Communication Pursuant to Article 94(3) EPC, EP App. No. 15827334.2, dated Apr. 30, 2019, 9 pages.
Communication Pursuant to Article 94(3) EPC, EP App. No. 15828152.7, dated Jan. 31, 2019, 7 pages.
Communication pursuant to Article 94(3)EPC, EP. App. No. 14803988.6, dated Oct. 25, 2019, 5 pages.
Corrected Notice of Allowance, U.S. Appl. No. 14/218,575, dated Jun. 24, 2019, 16 pages.
Decision to Grant a Patent, JP App. No. 2016-516743 dated Jan. 10, 2019, 5 pages.
Decision to Grant, JP App. No. 2016-566912, dated Dec. 26, 2019, 3 pages (2 pages of English Translation and 1 page of Original Document).
Final Office Action, U.S. Appl. No. 14/218,611, dated Aug. 2, 2019, 26 pages.
Final Office Action, U.S. Appl. No. 14/218,677, dated Jun. 10, 2019, 15 pages.
Final Office Action, U.S. Appl. No. 14/268,563, dated Nov. 8, 2019, 36 pages.

Final Office Action, U.S. Appl. No. 15/229,233, dated Sep. 24, 2019, 18 pages.
First Office Action and Search Report, CN App. No. 201580040813.6, dated Jun. 28, 2019, 19 pages.
First Office Action and Search Report, CN App. No. 201580040814, dated Jul. 10, 2019, 10 pages (Translation available only for the office action).
First Office Action, CN App. No. 201580022332.2, dated Aug. 5, 2019, 14 pages (7 pages of English Translation and 7 pages of Original Document).
Fourth Office Action, CN App. No. 201480025959.9, dated Apr. 12, 2019, 10 pages.
Hebbes L., et al., "2-Factor Authentication with 2D Barcodes," Proceedings of the Fifth International Symposium on Human Aspects of Information Security & Assurance (HAISA 2011), 2011, pp. 86-96.
IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology-Telecommunications and information exchange between systems, Local and metropolitan area networks-Specific requirements, Mar. 2015, 632 pages.
IEEE Std 802.11-2012: "Part 11: Wireless LAN Medium Access Control (MAC) and Physical Layer (PHY) Specifications," IEEE Standard for Information technology-Telecommunicationsand information exchange between systems, Local and metropolitan area networks-Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology-Telecommunicationsand information exchange between systems, Local and metropolitan area networks-Specific requirements, Dec. 18, 2013, 425 pages.
International Search Report and Written Opinion for PCT Application No. PCT/US2018/062608, dated Mar. 28, 2019, 12 pages.
International Search Report and Written Opinion, PCT App. No. PCT/US2019/01319, dated Apr. 1, 2019, 12 pages.
Manabe et al., "Person Verification using Handwriting Gesture", Proceedings of the 26th Annual Conference of Japanese Society for Artifical Intelligence, 2012, 9 pages (English Abstract Submitted).
Non-Final Office Action from U.S. Appl. No. 15/229,233, dated Apr. 18, 2019, 16 pages.
Non-Final Office Action, U.S. Appl. No. 14/218,677, dated Oct. 30, 2019, 5 pages.
Non-Final Office Action, U.S. Appl. No. 14/268,563, dated May 13, 2019, 47 pages.
Non-Final Office Action, U.S. Appl. No. 15/229,233, dated Jan. 31, 2020, 18 pages.
Non-Final Office Action, U.S. Appl. No. 15/822,531, dated Dec. 11, 2019, 19 pages.
Non-Final Office Action, U.S. Appl. No. 15/881,522, dated Jul. 16, 2019, 39 pages.
Notice of Abandonment, U.S. Appl. No. 16/209,838, dated Sep. 4, 2019, 2 pages.
Notice of Allowance from U.S. Appl. No. 15/595,460, dated Mar. 14, 2019, 9 pages.
Notice of Allowance from U.S. Appl. No. 15/954,188, dated Apr. 26, 2019, 5 pages.
Notice of Allowance from U.S. Appl. No. 14/218,575, dated Apr. 10, 2019, 10 pages.
Notice of Allowance, TW App. No. 102148853, dated Jul. 6, 2017, 3 pages.
Notice of Allowance, U.S. Appl. No. 14/218,646, dated Dec. 17, 2019, 6 pages.
Notice of Allowance, U.S. Appl. No. 14/218,646, dated Sep. 5, 2019, 6 pages.
Notice of Allowance, U.S. Appl. No. 15/229,254, dated Sep. 11, 2019, 8 pages.
Notice of Allowance, U.S. Appl. No. 15/595,460, dated May 17, 2019, 10 pages.
Notice of Allowance, U.S. Appl. No. 15/881,522, dated Dec. 31, 2019, 10 pages.

(56) References Cited

OTHER PUBLICATIONS

Notice of Allowance, U.S. Appl. No. 15/229,254, dated Jan. 15, 2020, 9 pages.
Notice of Reasons for Refusal, JP App. No. 2018-153218, dated Jun. 5, 2019, 7 pages.
Notice of Reasons for Refusal, JP App. No. 2018-209608, dated Oct. 7, 2019, 11 pages (7 pages of English Translation and 4 pages of Original Document).
Notice of Reasons for Rejection, JP App. No. 2016-566924, dated Mar. 7, 2019, 23 pages.
Notification of Reasons for Refusal, JP App. No. 2017-505072, dated Apr. 15, 2019, 8 pages.
Notification of Reasons for Refusal, JP App. No. 2017-514840, dated Apr. 1, 2019, 10 pages.
Notification of Reasons for Rejection, JP App. No. 2016-566912, dated Jan. 31, 2019, 11 pages.
Notification to Grant Patent Right for Invention, CN App. No. 201580021972, dated Jul. 16, 2019, 4 pages.
Office Action and Search Report, TW App. No. 107127837, dated Jun. 26, 2019, 4 pages.
Office Action, JP App. No. 2017-505504, dated Apr. 15, 2019, 3 pages of Original Document Only.
Rejection Judgment, JP App. No. 2017-505513, dated Jun. 17, 2019, 4 pages.
Requirement for Restriction/Election, U.S. Appl. No. 15/822,531, dated Oct. 16, 2019, 6 pages.
RFC 6063:Doherty, et al., "Dynamic Symmetric Key Provisioning Protocol (DSKPP)", Dec. 2010, 105 pages, Internet Engineering Task Force (IETF), Request for Comments: 6063.
RFC 6749: Hardt D., "The OAuth 2.0 Authorization Framework," Internet Engineering Task Force(IETF), Request for Comments: 6749, Available Online at <https://tools.ietf.org/pdf/rfc6749.pdf>, Oct. 2012, pp. 1-76.
Saito T., "Mastering TCP/IP, Information Security," Ohmsha Ltd., Sep. 1, 2013, pp. 77-80 (7 Pages).
Schmidt et al., "Trusted Platform Validation and Management," International Journal of Dependable and Trustworthy Information Systems, vol. 1, No. 2, Apr.-Jun. 2010, pp. 1-31.
Theuner et al., "Analysis of Advertising Effectiveness with EyeTracking", Department of Marketing, Ludwigshafen University of Applied Science, Proceedings of Measuring Behavior 2008, 2008, 2 pages.

* cited by examiner

SYSTEM AND METHOD FOR ADAPTIVE USER AUTHENTICATION

CROSS REFERENCE TO RELATED APPLICATIONS

This application claims the benefit of and priority to U.S. Provisional Patent Application No. 61/804,568, filed, Mar. 22, 2013, entitled, "Advanced Methods of Authentication And Its Applications". This application is related to co-pending U.S. patent application Ser. No. 14/145,439, filed Dec. 30, 2013, entitled, "System And Method For Non-Intrusive, Privacy-Preserving Authentication".

BACKGROUND

Field of the Invention

This invention relates generally to the field of data processing systems. More particularly, the invention relates to a system and method for adaptive user authentication.

Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score 153 based on the similarity between the extracted features and the biometric reference data 110. The biometric reference data 110 is typically the result of an enrollment process in which the user enrolls a fingerprint, voice sample, image or other biometric data with the device 100. An application 105 may then use the score 135 to determine whether the authentication was successful (e.g., if the score is above a certain specified threshold).

Systems have also been designed for providing secure user authentication over a network using biometric sensors. In such systems, the score 135 generated by the application 105, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

Authenticators such as those described above require some form of user interaction such as swiping the finger, or entering a secret code. These "normal" authenticators are intended to authenticate the user at a given point in time. In addition, "silent" authenticators may also be used which are designed to authenticate the user's device at a given point in time (rather than the user). These silent authenticators may rely on information extracted from the user's device without interaction by the user (e.g., sending a Machine-ID).

However, there are certain use cases where requiring explicit user interaction presents too much friction (e.g., near field communication (NFC) payments, frequently used apps requiring authentication without being tied to high value transactions), whereas a "silent" authentication technique such as sending a Machine-ID does not provide enough certainty that the legitimate user is still in possession of the device.

Several "continuous" authentication methods have been proposed by the research community such as Anthony J. Nicholson, "Mobile Device Security Using Transient Authentication," IEEE TRANSACTIONS ON MOBILE COMPUTING VOL. 5, NO. 11, pp. 1489-1502 (November 2006); Mohammad O. Derawi, "Unobtrusive User-Authentication on Mobile Phones using Biometric Gait Recognition" (2010); and Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf). Some of these methods have even been adopted by the industry such as BehavioSec, "Measuring FAR/FRR/EER in Continuous Authentication," Stockholm, Sweden (2009). These methods generally provide an assurance level that the legitimate user is still in possession a device without adding friction to the authentication process, but they focus on a single modality (i.e. using a wearable token, gait recognition, face and color of clothing recognition and user's keyboard input).

One problem which exists, however, is that directly providing location data or other personal (e.g. face image, color of clothing, gait or typing characteristics, . . . ) or environmental data (e.g. temperature, humidity, WLAN SSIDs, . . . ) to the relying party for supplementing the risk estimation violates the user's privacy in some regions of the world. Consequently, more advanced remote authentication techniques are needed which are both non-intrusive and adequately protect the end user's privacy.

In addition, the strength of current authentication methods (e.g. passwords, fingerprint authentication, etc) is mostly constant over time, but the resulting risk varies based on the current environment in which authentication is performed (e.g. the machine being used, the network the machine is connected to, etc). It would be beneficial to select and/or combine authentication modalities based on the current detected risk.

When considering increasing the assurance level of authentication, typically methods for enhancing the level of explicit authentication methods like requiring more complex passwords or use more accurate biometric methods like fingerprint or face recognition come to mind. In reality, the authentication assurance level (or the transaction risk derived from it) also depends on other data, such as whether the authentication performed from the same device as before and whether the location of the authentication is realistically near to the location of the last successful authentication (e.g., authentication at 1 pm in San Francisco and at 2 pm same day in Tokyo doesn't seem to be realistic for one person).

Passwords still are the predominant explicit authentication methods. Unfortunately they are attacked easily and those attacks scale well. Additionally, entering passwords is cumbersome especially on small devices like smartphones. As a consequence many users do not use password based protection methods to lock their phones at all or they use trivial PIN code.

Some smartphones are using fingerprint sensors in order to provide a more convenient way to authentication. Using biometric modalities for authentication has been criticized for not providing sufficient spoofing attack resistance and for introducing privacy issues by potentially not protecting biometric reference data properly.

Various "fusion" methods for combining biometric modalities have been proposed. Some of them address usability issues by reducing the false rejection rate (FRR); other address the security issue by reducing the false acceptance rate (FAR). These methods thus far have proposed static fusion algorithms. Unfortunately this approach still leads to varying assurance levels depending on the "other inputs" (as discussed above).

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
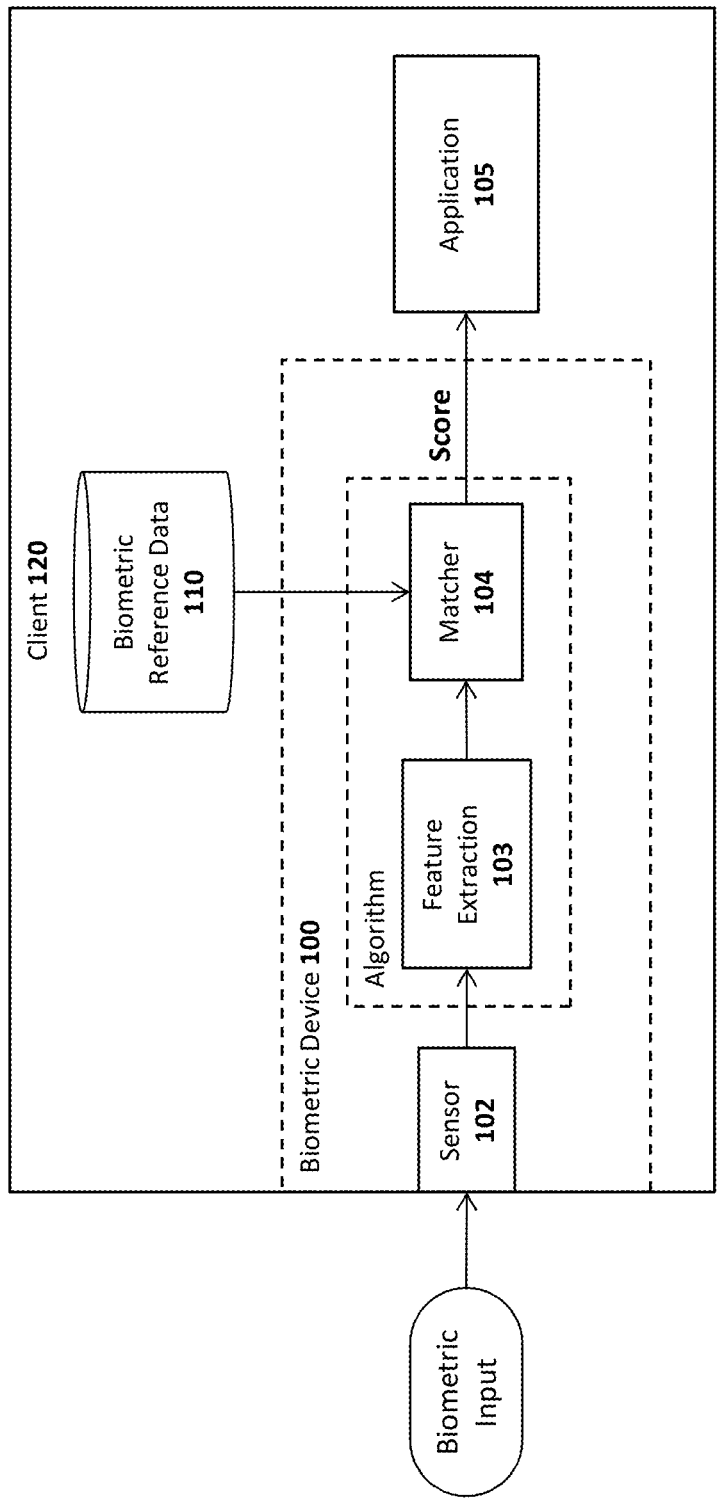
FIG. 1 illustrates an exemplary client equipped with a biometric device.

Described below are embodiments of an apparatus, method, and machine-readable medium for implementing non-intrusive, privacy-preserving authentication using adaptive modalities. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." Various different biometric devices may be used including, but not limited to, fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user). The authentication capabilities may also include non-biometric devices such as trusted platform modules (TPMs) and smartcards.

As mentioned above, in a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

One embodiment of the invention uses "normal" authentication techniques (e.g., swiping a finger, entering a code, etc) in order to train the authentication system to recognize non-intrusive authentication situations. In addition, one embodiment returns the authentication state of the device to the relying party rather than sensitive information such as a Machine ID when authentication is required.

Some embodiments of the invention described below may work completely frictionless (i.e. without requiring any explicit user authentication). Behavioral or other techniques may be used to continuously measure an assurance level which indicates the current assurance that an authorized user is in possession of the device. The assurance level may be calculated, for example, based on the time which has passed since the last explicit user authentication (e.g., to SIM card or phone unlock with PIN or finger swipe). Assuming that amount of time which has passed is within a particular threshold (e.g., 5 seconds, 5 minutes, 1 hour, etc), the device may be considered to be in a "legitimate user state" and the assurance level set to a maximum value (e.g., 100 on a normalized scale of −100 to 100).

Following the legitimate user state, the assurance level may be measured based on a combination of the elapsed time since explicit user authentication and other variables which indicate that the authorized user is in possession of the device (e.g., based on non-intrusive input detected from device sensors). For example, the biometric gait of the user may be measured using an accelerometer or other type of sensor in combination with software and/or hardware designed to generate a gait "fingerprint" from the user's normal walking pattern. In addition, the distance to frequently visited destinations of the legitimate user may be tracked, stored and subsequently used to determine the assurance level. For example, if the user is connecting to a relying party from a location known to be the user's home or office, then the assurance level may be set to a relatively high value, whereas if the device is connecting from an unknown or distant location, then the assurance level may be adjusted to a lower level.

Various other types of non-intrusive measurements may be performed to determine whether the authorized user is in possession of the device including, for example, the identity of networks or devices to which the client device is connected such as Bluetooth devices, near field communication (NFC) devices, Wifi devices such as routers or access points, smart watches, other computing devices, Nymi bracelets, to name a few. Wifi devices may include the visibility of Wifi networks in reach such as a personal Wifi router at home and Wifi-enabled computers used by colleagues or family members. In addition, certain specific characteristics of the client device such as acceleration sensor characteristics and digital camera sensor pattern noise, may be used for non-intrusive measurements. Touch screen gestures of normal user interaction may also be analyzed and stored as reference data as well as user typing behavior from normal user interaction. Of course, the foregoing are merely examples; the underlying principles of the invention are not limited to any set of non-intrusive variables.

The end result is that an assurance level that the legitimate user still is in the possession of the device may be sent to the relying party in the authentication response. In one embodiment, the assurance level is "signed" or otherwise authenticated by a key (e.g., a relying-party specific key established and attested in a registration phase as discussed below). In one embodiment, the assurance level is normalized to a value between −100 and 100, where −100 means "almost certain it is not the legitimate user," 0 means "don't know," and 100 means "almost certain that it is the legitimate user."

In one embodiment, the relying party may ask the client device for using an additional "normal" authenticator response if the assurance level is not acceptable for the envisioned transaction. Regardless of what level of authentication is required, one embodiment does not disclose personal data to the relying party. Instead, it uses a cryptographic key dedicated to one specific relying party in order to authenticate the authenticator to the relying party.

Figure 2:
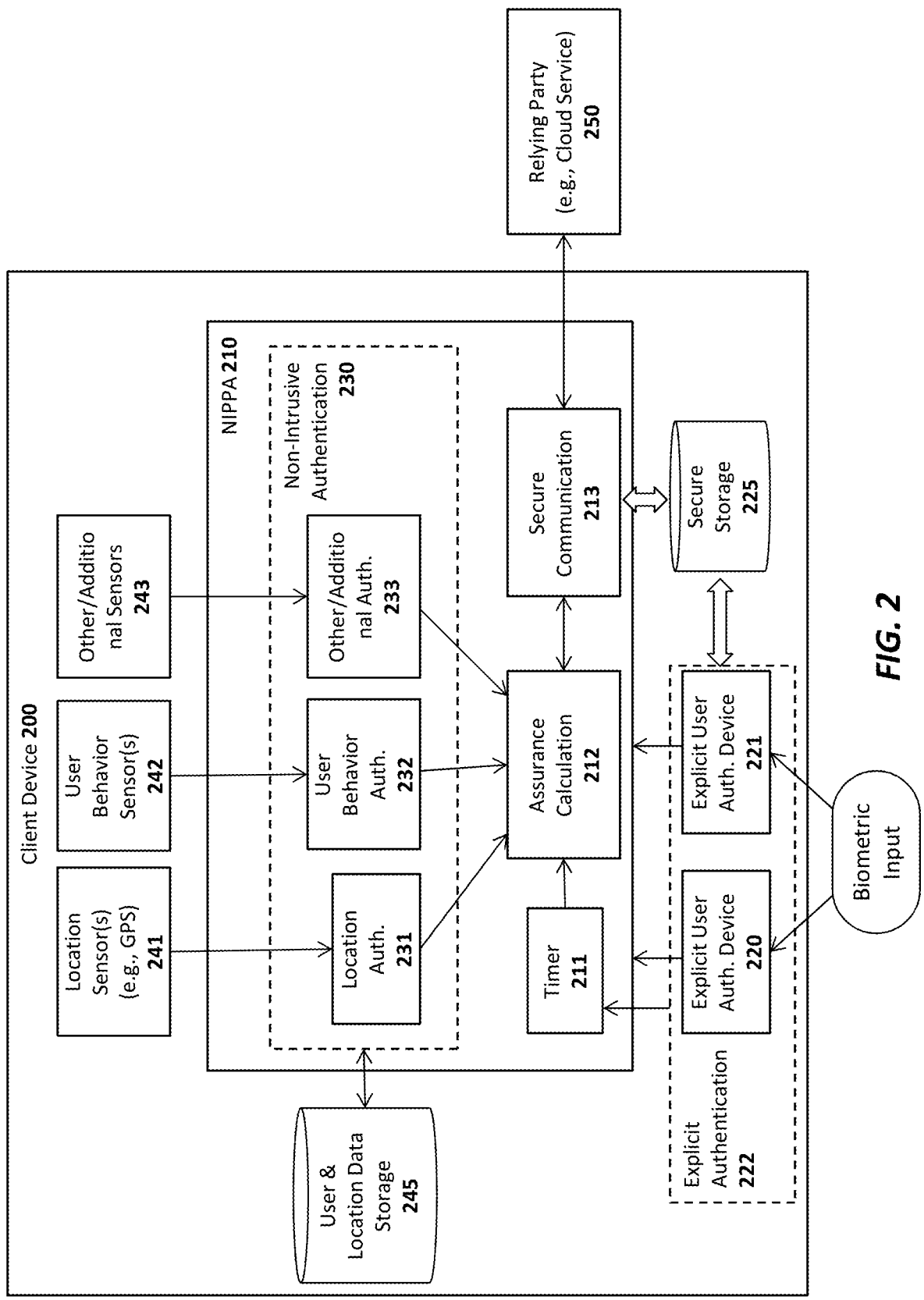
FIG. 2 illustrates one embodiment of a non-intrusive privacy-preserving authenticator (NIPPA)

One embodiment of an architecture for providing non-intrusive privacy-protecting authentication is illustrated in FIG. 2 which includes a non-intrusive privacy-preserving authenticator (NIPPA) 210 including an assurance calculator 212 for determining the current assurance level based on input from non-intrusive authentication mechanisms 230 (e.g., location, gait measurements, etc) and one or more explicit user authentication devices 220-221 (e.g., fingerprint sensors, input devices for entering ID codes, etc). In one embodiment, the explicit user authentication devices 220-221 include the same or similar architecture as shown in FIG. 1.

In the embodiment illustrated in FIG. 2, the non-intrusive authentication 230 includes a location authentication module 231 for performing location-based authentication using a location sensor(s) 241 and historical or user-specified location data stored within a user/location data storage device 245 (e.g., which may be implemented as a file system or database). By way of example and not limitation the location sensor 241 may include a GPS device and/or a module for detecting a current access point or cell tower to which the client 200 is connected (which can be used to estimate the device's current location). Any sensor capable of providing data related to a user's location may be used. The location authentication module 231 determines the effect that the current location of the client device has on the assurance level. For example, if the device is currently at a "home" or "office" location (according to historical or user-specified location data 245) then the assurance level may be adjusted upwards; whereas if device is currently at a distant, unknown location, then the assurance level may be adjusted downwards. In addition to automatically training the system during the "legitimate user state" (as described herein) in one embodiment, the user is provided with the ability to manually specify certain locations as "trusted" and therefore having a high assurance level (e.g. when the user is at home or at the office). The results of the location authentication module 231 are provided to the assurance calculation module 212 to that it may be factored into current assurance level calculations.

The user behavior authentication module 232 relies on one or more user behavior sensors 242 to determine the extent to which the current user behavior is consistent with historical user behavior (stored in user & location data storage 245). For example, the user behavior sensors 242 may provide accelerometer measurements that the user behavior authentication module may use to determine the gait of the user currently in possession of the device 200. It may then compare these measurements with the known gait of the user (collected following prior explicit user authentications and stored in storage device 245) to arrive at a level of confidence that the legitimate user is in possession of the device. The results are provided to the assurance calculation module 212 to that it may be factored into current assurance level calculations.

Various other/additional authentication devices 233 may collect data from other/additional sensors 243 to perform authentication calculations, the results of which are provided to the assurance calculation module 212 to factor into current assurance level calculations.

Although illustrated as separate modules in FIG. 2, the location authentication module 231, the user behavior module 232 and any other authentication modules 233 may form part of the assurance calculation module 212. The underlying principles of the invention may be implemented using various different logical arrangements of modules.

As illustrated, in one embodiment, the assurance calculation module 212 relies on a timer 211 when measuring the amount of time which has passed since the last explicit user authentication. As discussed in detail below, the amount of time which has passed since the last explicit user authentication may be used to determine whether the device is currently in a "legitimate user state" and to adjust the assurance measurement accordingly.

Once the assurance calculation module 212 has arrived at a current assurance measurement, it may communicate the measurement to a relying party (a cloud service in one embodiment) established via a secure communication module 213. For example, each authenticator 220-221, including the non-intrusive authenticator 230 may exchange a relying-party-specific and attested key in a registration operation (preceding authentication). The assurance level returned in the authentication operation may be part of a message signed/encrypted by the relying-party-specific authentication key. In addition, as discussed below, the message may also include nonce (e.g., a random challenge) generated by the relying party.

In one embodiment, secure storage 225 is a secure storage device provided for storing the authentication keys associated with each of the authenticators and used by the secure communication module 213 to establish secure communication with the relying party.

As mentioned, in one embodiment, the NIPPA 210 leverages existing (explicit) user authentication techniques (e.g. password based system login, SIM card unlock, etc) to maintain a "legitimate user" state within a defined time window after each of such successful authentication (up to T1 seconds). The NIPPA 210 may periodically measure user behavior from the various sensors 241-243 and while in the "legitimate user" state, may update its internal reference data vector according to the measurement. While not in the "legitimate user" state, the NIPPA 210 may compute the normalized "distance" to the reference data vector based on the current measurement. This "distance" is considered the certainty that the legitimate user is still in possession of the authenticator.

When asked to authenticate a user, the NIPPA 210 may check to determine whether it is in the "legitimate user" state. If so, authentication is considered successful and the maximum assurance level (e.g., 100) is returned. If not in the "legitimate user" state, the NIPPA 210 may return an assurance level computed by the assurance calculation module 212 based on the latest measurements. The NIPPA 210 may then combine the assurance level with the time difference td of that measurement tm to current time tc (td=tc−tm). In one embodiment, this is done using the following logic:

(1) if (assurance-level>=0) then resulting-assurance-level=assurance-level*(max (T0−td, 0)/T0), where T0 is the maximum acceptable time difference; and (2) if (assurance-level<0) then resulting-assurance-level=assurance-level.

Figure 3:
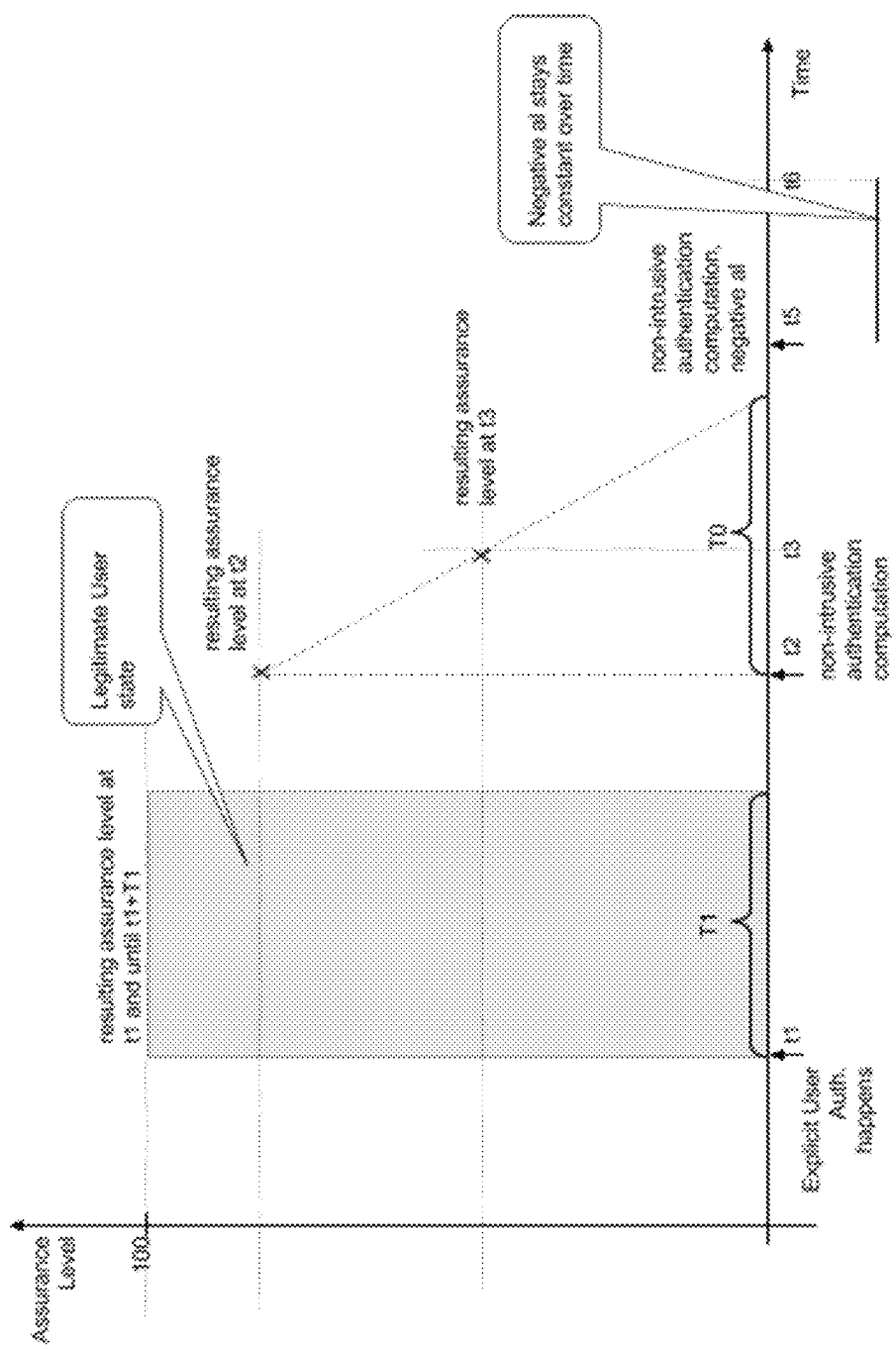
FIG. 3 graphically illustrates the operation of one embodiment of the invention during a "legitimate user state" and following the legitimate user state.

The operation of one embodiment of the invention according to the above equations is illustrated in FIG. 3. At time t1 the user performs an explicit authentication (e.g., swipes a finger, enters a PIN in order to unlock the SIM card, etc). The time window until t1+T1 is considered the "Legitimate User" state. As mentioned, the non-intrusive authenticators may be trained within the legitimate user state. For example, the user's gait may be measured, and/or locations visited by the user may be recorded and subsequently used to perform non-intrusive authentication.

At time t2 (outside of the legitimate user state) the assurance calculation module 212 computes the assurance level based on the non-intrusive authenticator. The result is positive, indicating that it the device is likely in full control of the legitimate user. After this computation, the assurance level decreases over time (e.g., the legitimate user may expose the device to non-legitimate people). For example, at time t3 the assurance level has dropped significantly from time t2. In one embodiment, the non-intrusive assurance level is only computed periodically in order to avoid excessive power and CPU performance consumption.

At t5 another non-intrusive assurance level computation occurs. This time the result is negative, indicating a likelihood that the device is not under full control of the legitimate user. This negative assurance level does not change until another computation is performed based on the non-intrusive authenticator (e.g., at time t6).

Figure 4:
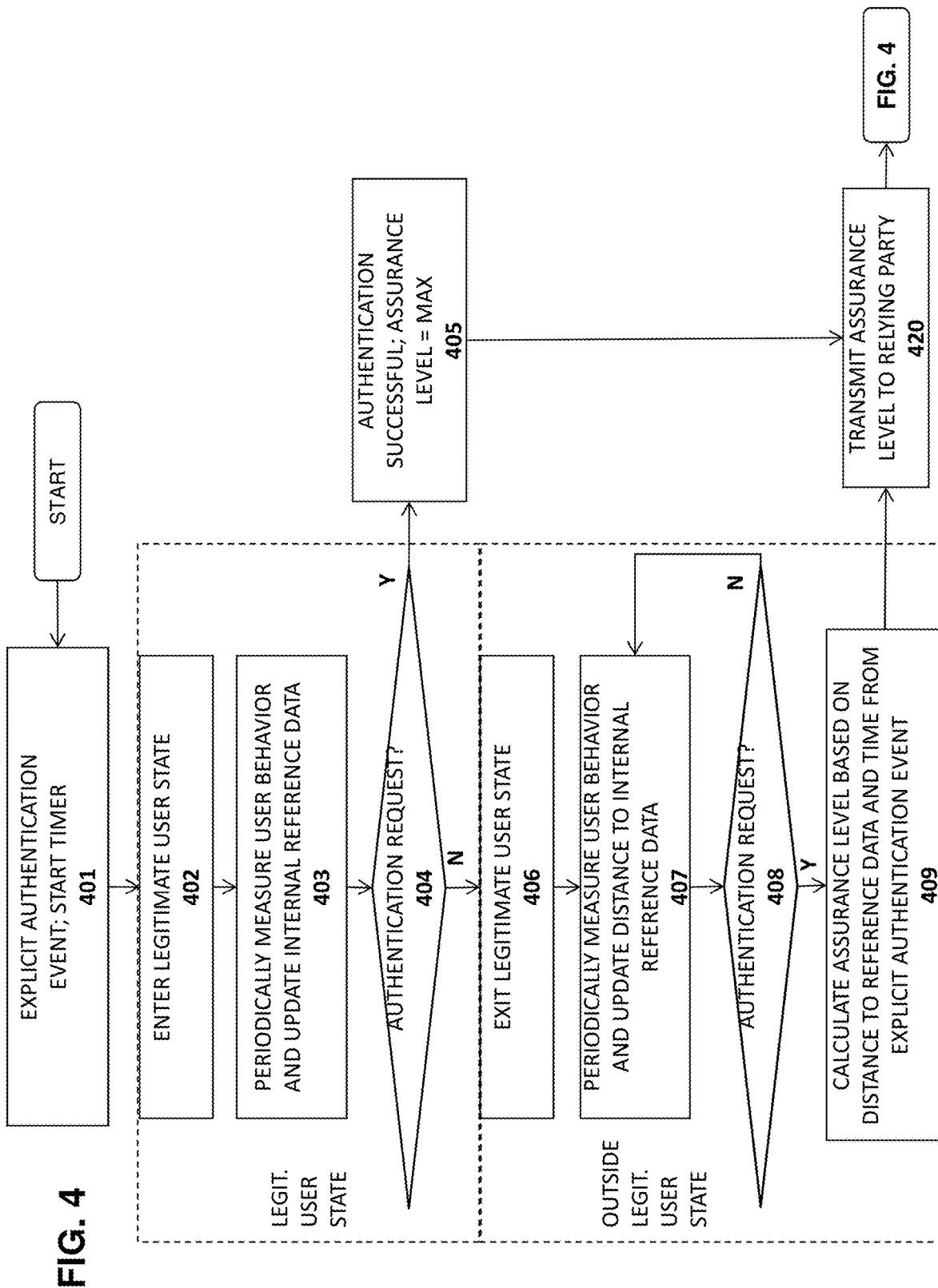
FIGS. 4-5 illustrate one embodiment of a method for non-intrusive privacy-preserving authentication.
Figure 5:
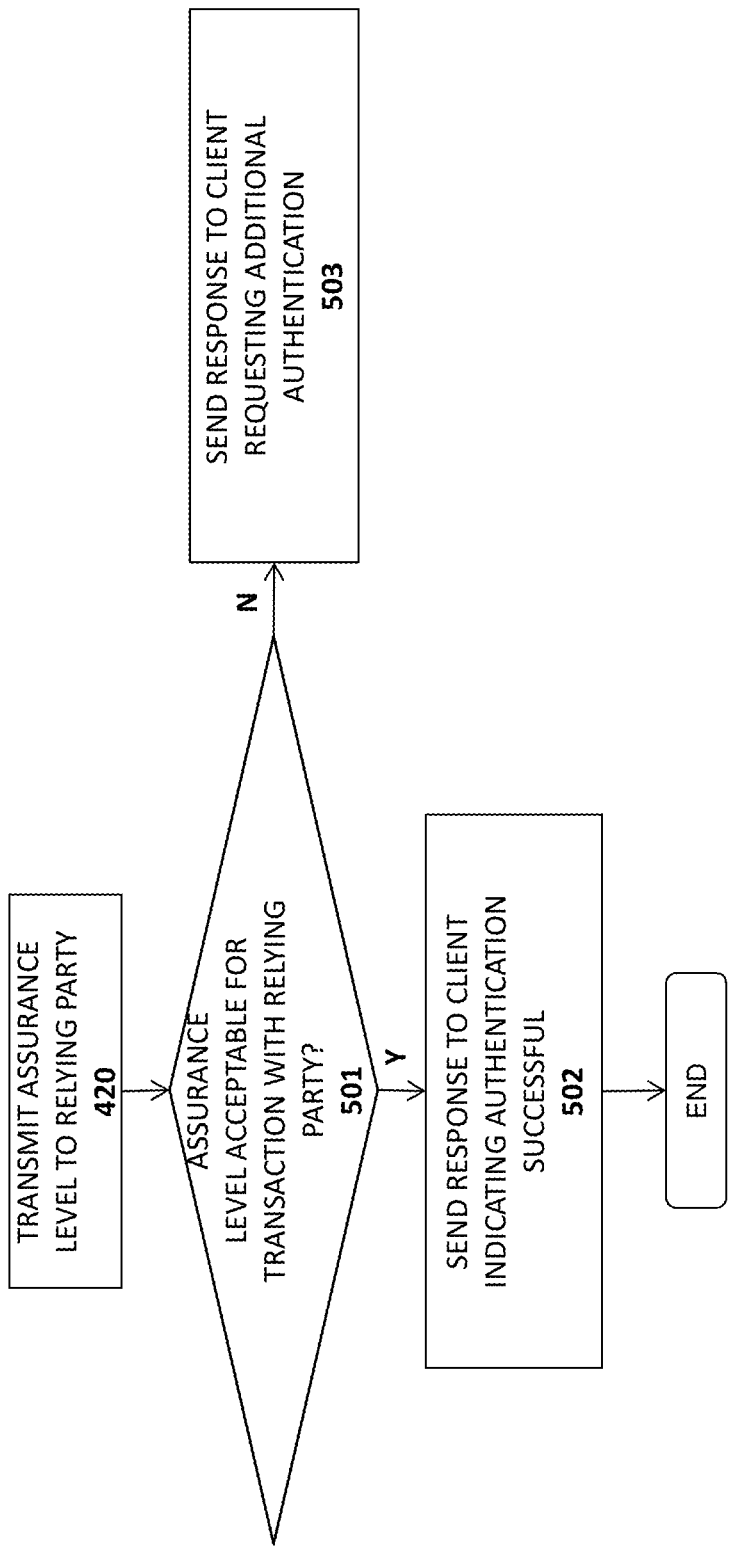

A method in accordance with one embodiment is illustrated in FIGS. 4-5. The method may be implemented within the system architecture such as that shown in FIG. 2, but is not limited to any particular system architecture.

At 401, an explicit authentication event occurs such as a swipe on a fingerprint sensor or the entry of a PIN to unlock the device. A timer may also be started to measure the time which has elapsed from the explicit authentication event. At 402, the legitimate user state is entered and at 403, various aspects of user behavior may be measured and stored for later reference (e.g., locations, user gait, etc). If an authentication request occurs during the legitimate user state, determined at 404 (e.g., resulting from a transaction with a relying party), then at 405 the maximum assurance level is selected and sent to the relying party at 420.

At 406, the system exits the legitimate user state (e.g., because the timer indicates that a specified amount of time has elapsed). At 407, the system periodically measures the user behavior by comparing data from sensors against internal reference data stored in operation 403. By way of example, measurements associated with the gait of the user (collected when in the legitimate user state) may be compared with current gait measurements (collected at 407) and a correlation between the two may be calculated (referred to as the "distance" to the reference data). If an authentication request is received when outside of the legitimate user state, determined at 408, then at 409 the current assurance level is calculated based on the distance to the internal reference data and potentially the time from the explicit authentication event. The assurance level is then transmitted to the relying party at 420.

Turning to FIG. 5, if the assurance level transmitted to the relying party is acceptable for the current transaction with the user, determined at 501, then the relying party may send a response to the client device indicating a successful authentication. If not, then at 503, the relying party may send a response to the client indicating that additional authentication is needed (e.g., potentially explicit user authentication if non-intrusive authentication is insufficient).

In an alternate embodiment, the relying party may initially specify an assurance level required for a particular transaction and the system will ensure that the required assurance level is met, potentially using explicit user authentication if the non-intrusive authentication techniques are insufficient. The system may then send the relying party an indication of successful authentication (rather than an assurance level).

Figure 6:
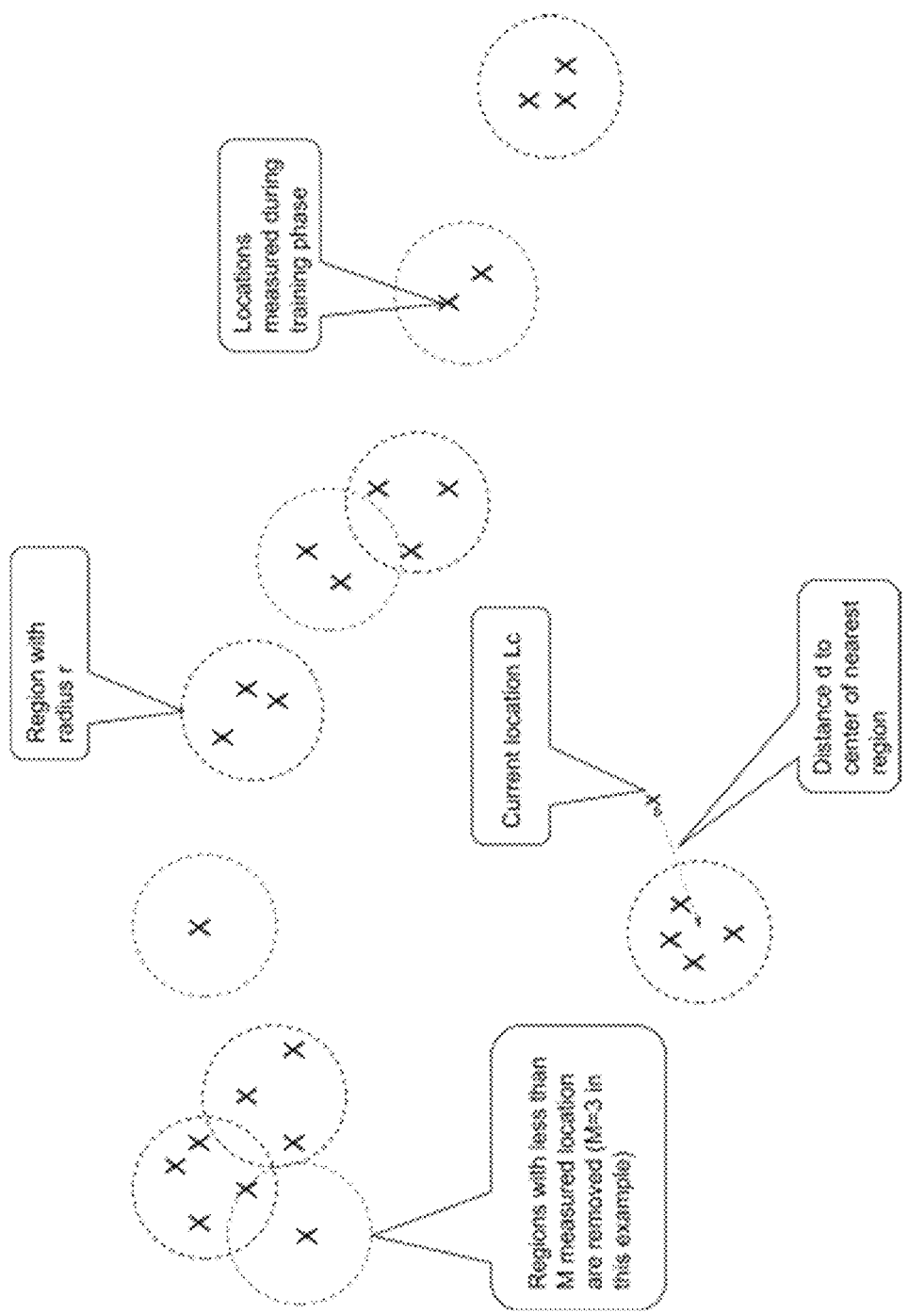
FIG. 6 illustrates a distance function employed for location-based authentication in one embodiment.

As mentioned above, one embodiment of the invention calculates a distance from a set of known user locations to determine the assurance level. Referring to FIG. 6, location-based measurements (e.g., such as GPS) may be used to calculate the "distance" function as follows.

In a preprocessing operation, all measured locations (Ln) are assigned to their nearest "regions." A region is defined as a circle with a radius of r (e.g. 10 meters). The Regions are placed such that a minimal number of Regions covers all Ln. All regions which cover fewer than M locations are removed from the set of Regions (i.e., as they are not considered "frequent" locations of the user).

The "distance" (d) is then determined using distance= (distance of the current location (Lc) to the nearest center of a Region (Rn))/r where r is the radius of a region. This value is smaller or equal to 1 if Lc is inside an existing region and may get very big if Lc is outside. The assurance level is then calculated using: Assurance-Level=Max(100−50*floor(d), −100), which will be in the range of −100 to 100.

In some of the embodiments above, it is assumed that the legitimate user is still in possession of the client device within a specific time window following an explicit authentication or if current behavior is very similar to measured behavior. However, the above embodiments only update the behavioral reference data inside a specific time window after an explicit authentication.

Figure 7:
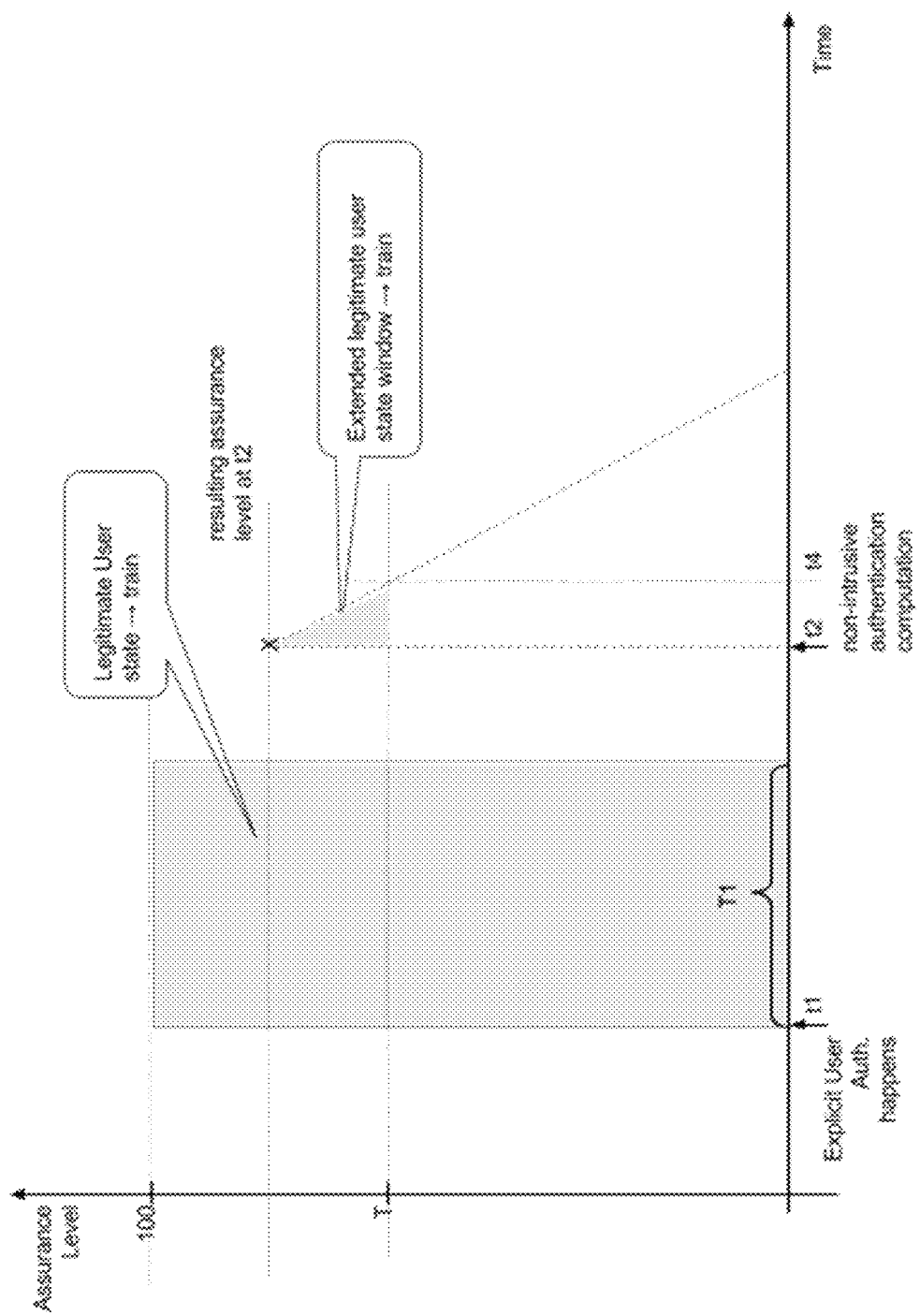
FIG. 7 graphically illustrates the operation of one embodiment of the invention using an extended legitimate user state window.

As illustrated in FIG. 7, one embodiment of the invention uses an extended time window to update behavioral reference data (i.e., train the system) in addition to the standard time window for the legitimate user state. As a result, the complete time window (including the standard time window and extended time window) may be defined as follows: (1) if inside the legitimate user state time window following a successful explicit user authentication (i.e. t1 . . . t1+T1), or (2) if the returned assurance level would be above a certain threshold T (e.g., T=90 at, e.g., t2, t4, etc). Setting the threshold to 0 is undesirable because it would make it very easy for an attacker to "shift" the behavioral reference to his favor.

Figure 8:
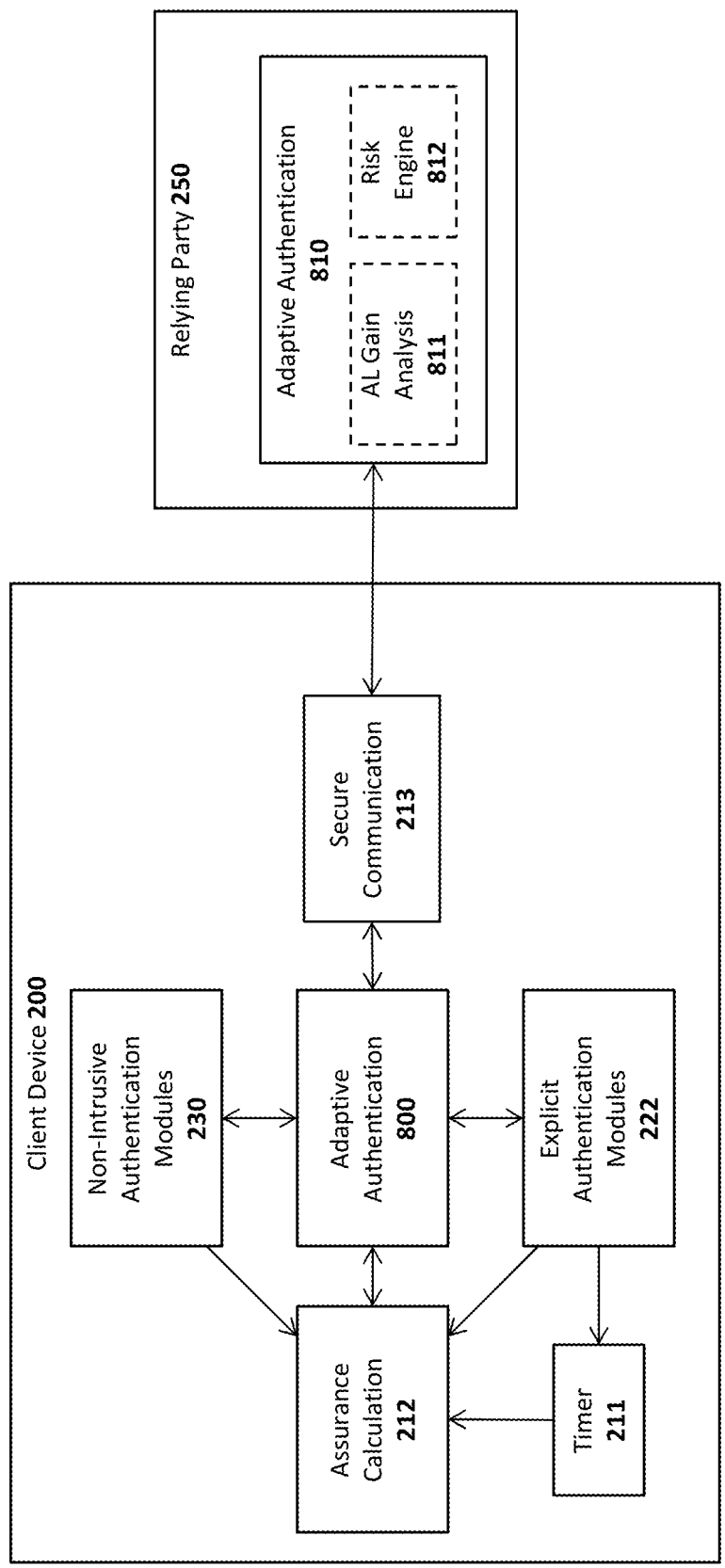
FIG. 8 illustrates an adaptive authentication module in accordance with one embodiment of the invention.

FIG. 8 illustrates one embodiment of the invention for implementing adaptive authentication techniques. As in the embodiments discussed above, this embodiment includes one or more non-intrusive authentication modules 230 for performing non-intrusive authentication (e.g., based on location, sensed user behavior, etc) and one or more explicit authentication modules 222 for performing explicit user authentication (e.g., requiring a PIN, fingerprint scan, etc). In addition, as in prior embodiments, an assurance calculation module 212 performs assurance calculations based on, for example, the time since the last explicit authentication (provided by timer 211) and/or authentication data provided by the various authentication modules 230, 222. The secure communication module 213 establishes secure communication with the relying party 250 (e.g., using a secure encryption key as discussed above).

In one embodiment, an adaptive authentication module 800 dynamically selects among the available non-intrusive authentication techniques and explicit/intrusive authentication techniques to arrive at an assurance level sufficient for a current transaction with the relying party 250. Alternatively, or in addition, an adaptive authentication module 810 on the relying party 250 may perform the authentication selection techniques to arrive at a sufficient assurance level. The underlying principles of the invention remain the same regardless of whether the authentication selection techniques are implemented on the client device 200 (by adaptive authentication module 800) or the relying party 250 (by the adaptive authentication module 810).

Moreover, the "relying party" 250 illustrated in FIG. 8 may represent a trusted third party server which may implement the authentication techniques described herein on behalf of the relying party, and provide the results to the relying party. Thus, while the embodiments of the invention are described in terms of a "relying party," the underlying principles of the invention may be implemented using servers outside of the perimeter of the network operated by the relying party.

As discussed in greater detail below, in one embodiment, the adaptive authentication module 810 includes a risk engine 812 to determine a risk level based on variables associated with the client device (e.g., based on current IP address, IP packet round-trip delay times, etc). In addition, an assurance level gain analysis component 811 may determine the amount by which a current assurance level must be increased to arrive at an acceptable assurance level. While these elements are illustrated in FIG. 8 as components of the adaptive authentication module 810 of the relying party, they may also be implemented within the adaptive authentication module 800 of the client while still complying with the underlying principles of the invention.

In one embodiment, once a client device 200 connects to the relying party 250 (e.g., to initiate a transaction), the risk engine 812 determines the risk (or an assurance level) based on all data currently available. This may include, for example, a geo-location of the client device 200 (e.g., as derived from the IP address, or provided by a mobile network operator), the round-trip delay times of packets transmitted between the client device 200 and relying party 250, the number of hops for network packets sent between the client device 200 and relying party 250, a specific "user agent" string sent by a user agent executed on the client device 200, to name a few. In one embodiment, the risk engine 812 then evaluates this data to arrive at an implicit "risk score" (or a preliminary assurance level inversely related to the risk score), which may be used to determine the amount of additional assurance required to authenticate the user for a given transaction.

In one embodiment, based on the implicit risk score, the adaptive authentication module on the relying party 810 or the client device 800 determines a set of one or more authentication modules 222, 230 with the potential of increasing the overall assurance level to the required level for an intended transaction (i.e., when combined with the preliminary assurance level/implicit risk score). In one embodiment, the assurance level gain analysis module 811 determines the amount of gain required and the adaptive authentication module 800, 810 is provided with an indication of the required assurance level gain as a parameter. The adaptive authentication module 800, 810 then uses this "gain" parameter in order to determine the most convenient set of authentication techniques (non-intrusive 230 and/or explicit 222) in order to achieve (at least) the required gain. The adaptive authentication module 800 may include a formal description of the selected set of authentication techniques in a response to the relying party 250 (e.g. as an authenticated extension). The relying party 250 may then verify whether the resulting overall assurance level meets the required level.

By way of example, and not limitation, the adaptive authentication module 800 may combine authentication modalities such as device fingerprinting (e.g. recognizing sensor flaws, or camera sensor pattern noise); environmental information (e.g. GPS based location; location derived from WIFI networks; existence of wired or wireless connections to other gadgets like Nymi, smart watches (pebble), or peripherals like headsets, . . . etc.); behavioral data (e.g. the way the user takes the device out of a pocket, typing behavior, gait, . . . etc); the time since the device was in a "trusted" state; and potentially the result of a new explicit authentication using one or more authentication modalities (biometric or otherwise) required to achieve the required (remaining) gain in the assurance level.

The result of the above techniques is that users may opt for the most convenient authentication method. In the case of smartphones this may simply be having access to the phone (see above). Instead of asking the user to select an authentication method and subsequently, requiring the user for another explicit authentication, the relying party 250 sends an indication of the required assurance level gain to the adaptive authenticator 800, 810 which identifies the least intrusive set of authentication techniques. The adaptive authentication module 800, 810 does not always require an explicit (intrusive) user authentication (like entering a PIN or swiping a finger), nor is it solely based on non-intrusive modalities. Instead, the authenticator chooses the appropriate combination of all available modalities (on the client side) such that the required assurance level gain is achieved.

As discussed in detail above, the time since the device was in trusted state is important as hacking/spoofing modalities may take time. For example, if a user loses a phone and someone attempts to hack it, it may take a day before the fingerprint can be captured from the display, an appropriate rubber finger created and subsequently used to gain access. Consequently, requiring a PIN entry after 24 hours or less since last trusted state, would be a sufficient protection against this type of attack. The next level of attack is one in which the fingerprint is captured before having access to the device. These attacks are seen less frequently in practice. However, if the relying party 250 needs protection against such attacks, the adaptive authentication module 800, 810 may need to factor in location data or the existence of other gadgets or peripherals in order to accept the biometric modality.

Figure 9:
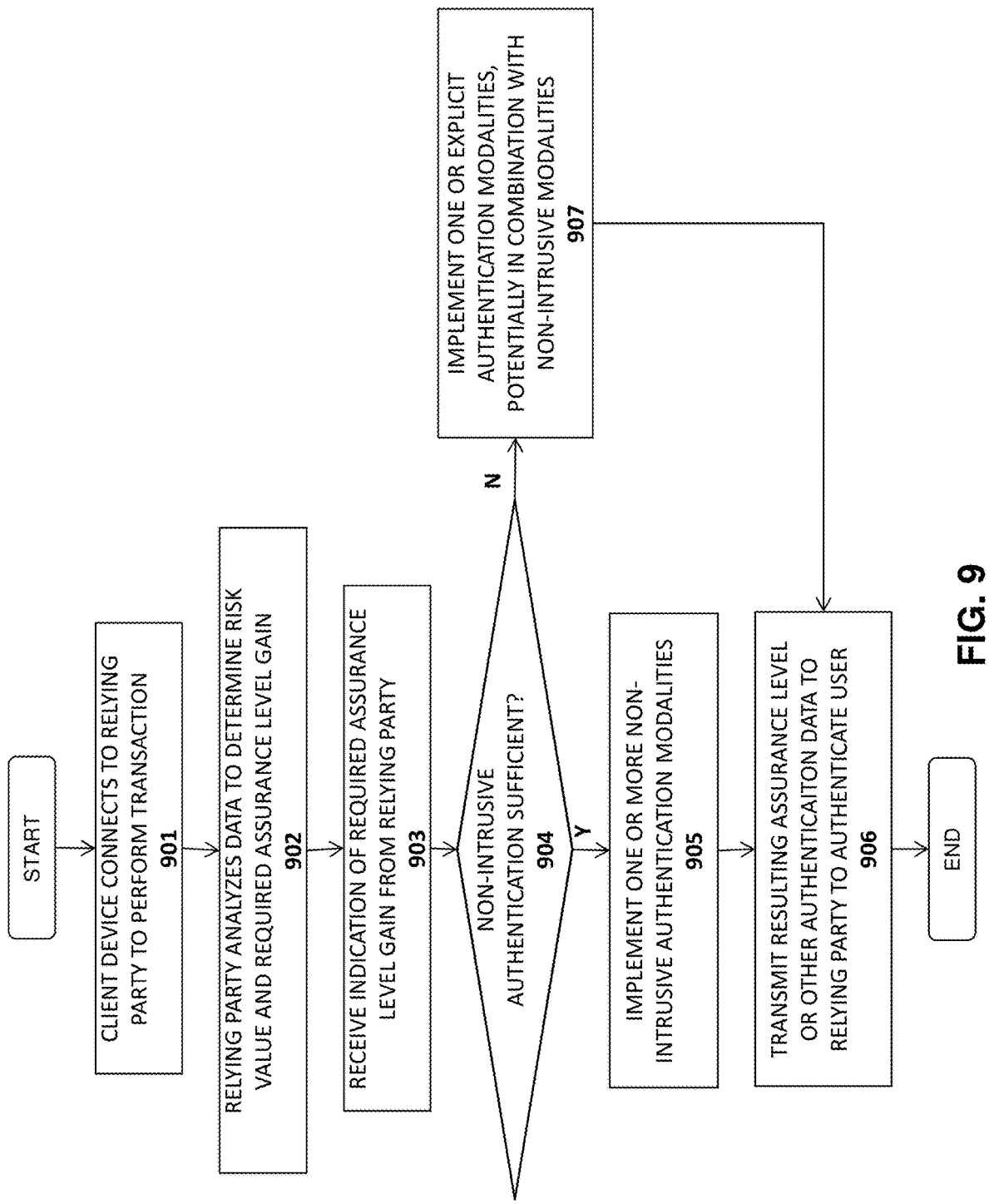
FIG. 9 illustrates one embodiment of an adaptive authentication method.

A method in accordance with one embodiment of the invention is illustrated in FIG. 9. As discussed above, the "relying party" as used herein may be the actual party relying on the accurate authentication of the user or may be a third party service authenticating the user on behalf of the relying party.

At 901, the client device connects to the relying party to perform a transaction (e.g., a transaction to log in to an online account, a monetary transaction, etc). At 902, the relying party analyzes any available data related to the client device to determine a risk value and the required assurance level gain needed to authenticate the user. For example, the data may indicate that the user is connecting to the relying party from an unknown network location (e.g., a foreign country never previously visited by the user) and/or that the number of network routing hops or latency between the client and relying party is above a threshold. In such a case, the risk value may be set to a relatively high value (or, conversely, the implicit assurance level may be low). However, if the user has just recently explicitly authenticated to the device (e.g., entering a PIN), then this would tend to decrease the risk level (or raise the implicit assurance level).

Based on the assurance level required to complete the transaction, the assurance level gain may be determined. This may be accomplished, for example, using an equation such as: Implicit Assurance Level+Assurance Level Gain=Required Assurance Level, or Assurance Level Gain=Required Assurance Level−Implicit Assurance Level. Various other equations may be used to determine the assurance level gain while still complying with the underlying principles of the invention.

At 903, an indication of the needed assurance level gain is received. If non-intrusive authentication techniques are sufficient to meet the assurance level gain, determined at 904, then they are used at 905 to authenticate the user. If not, then at 907, one or more explicit authentication modalities are implemented, potentially in combination with one or more non-intrusive authentication modalities. As mentioned, the modalities may be selected so as to be the least burdensome to the end user (e.g., based on user-specified preferences).

Figure 10:
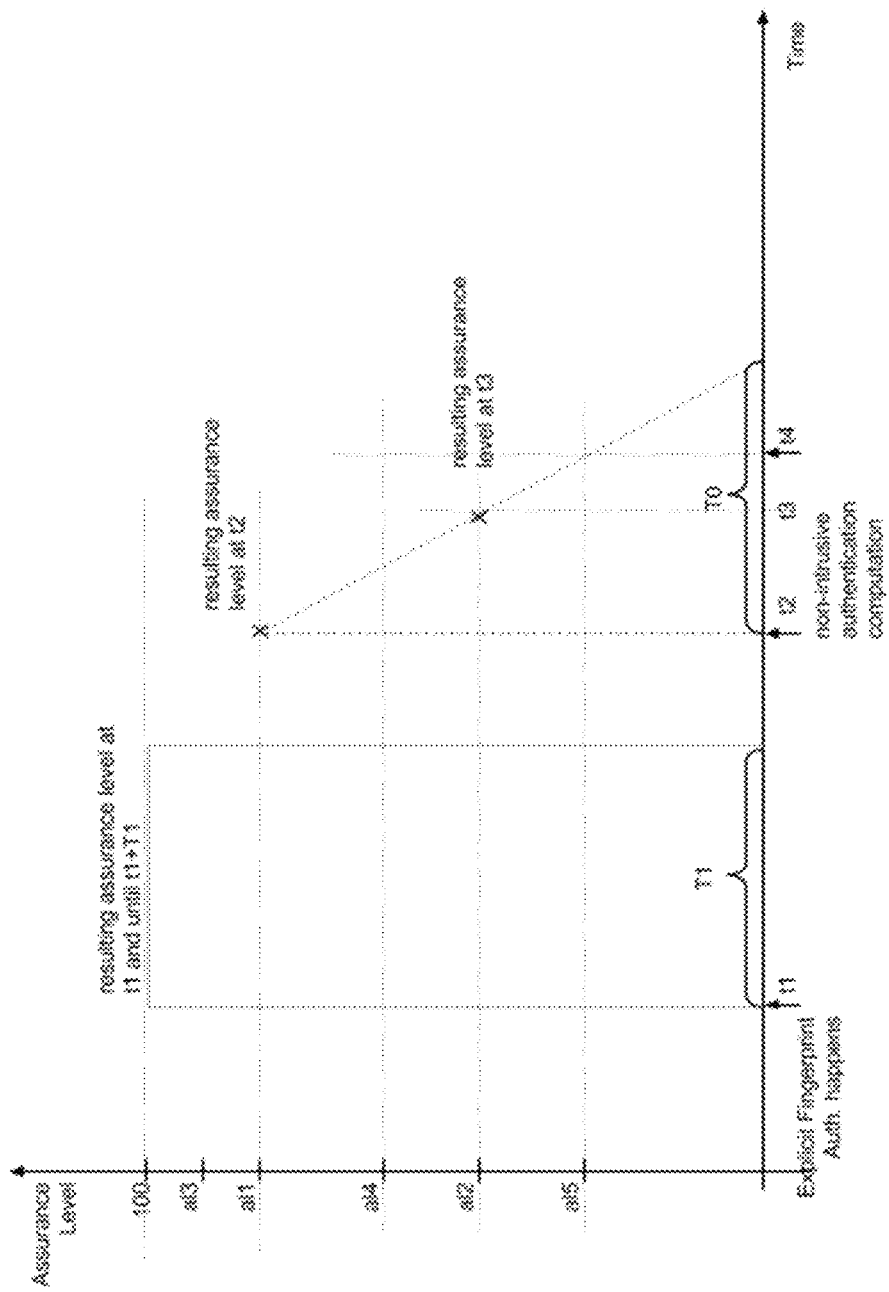
FIG. 10 graphically illustrates adaptive authentication in accordance with one embodiment.

FIG. 10 graphically illustrates how the embodiments of the invention described above may evaluate the assurance level to determine authentication modalities. At time t1, the user performs an explicit authentication (e.g., swiping a finger, entering a PIN, etc). At time t2, the relying party asks for authentication with an assurance level gain of al4. The non-intrusive authentication modality delivers assurance level al1 which is higher than al4, so there is no need to trigger an explicit authentication.

In contrast, at time t4, the relying party asks for authentication with an assurance level gain of al4. The non-intrusive authentication modality would only deliver al5 at that time (as illustrated by the graph). As a consequence, in this case, the adaptive authenticator module will select at least one explicit authentication modality to raise the assurance level from al5 to al4.

Exemplary System Architectures

Figure 11A:
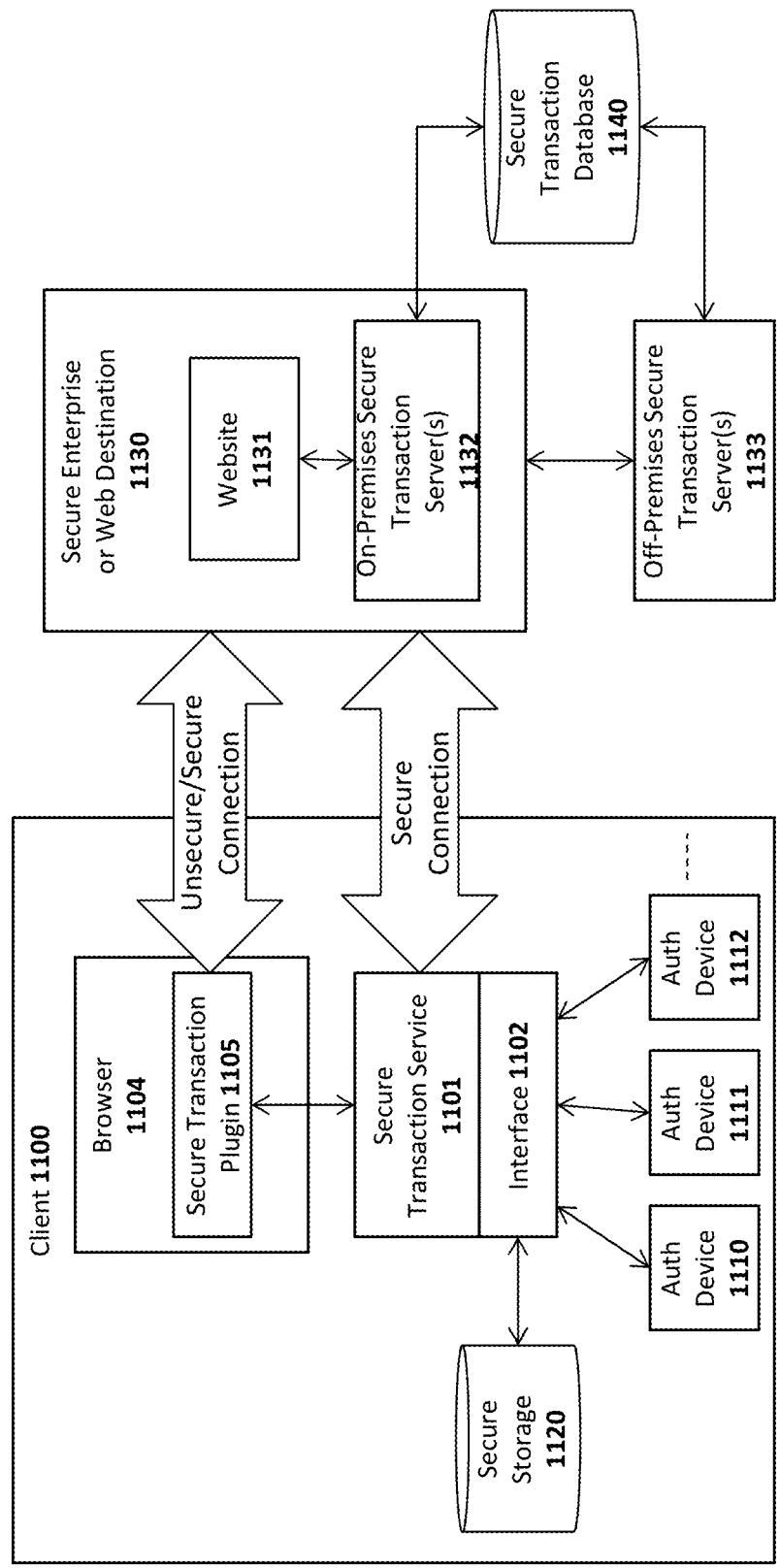
FIGS. 11A-B illustrate different architectural arrangements within which embodiments of the invention may be implemented.
Figure 11B:
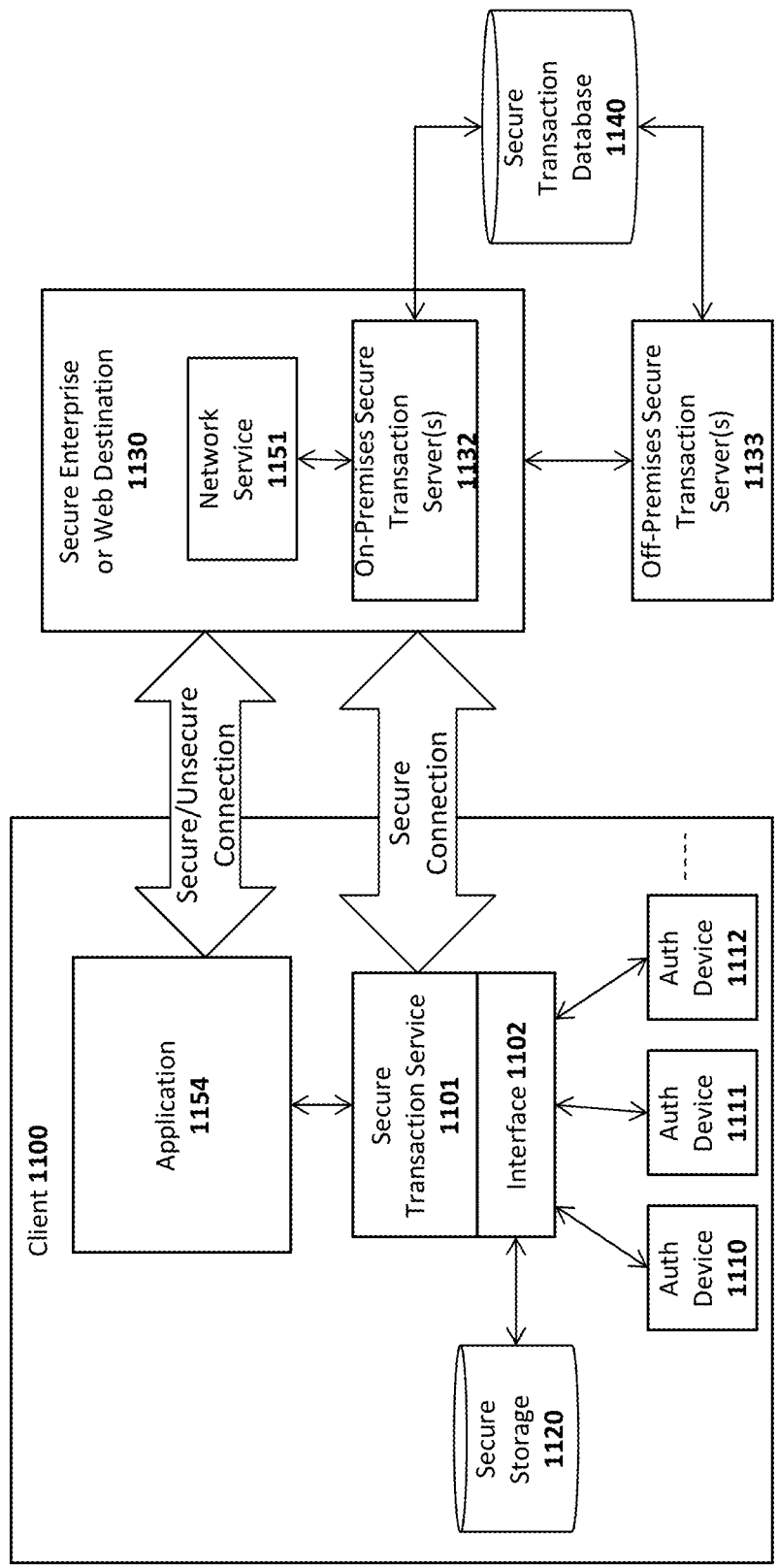

FIGS. 11A-B illustrate two embodiments of a system architecture comprising client-side and server-side components for authenticating a user. The embodiment shown in FIG. 11A uses a browser plugin-based architecture for communicating with a website while the embodiment shown in FIG. 11B does not require a browser. The various techniques described herein for non-intrusive privacy-preserving authentication and adaptive authentication may be implemented on either of these system architectures. For example, the NIPPA 230 shown in FIG. 2 may be implemented as part of the secure transaction service 1101 (including interface 1102) and/or the secure transaction plugin 1105 or application 1152. It should be noted, however, that the embodiment illustrated in FIG. 2 stands on its own and may be implemented using logical arrangements of hardware and software other than those shown in FIGS. 11A-B.

While the secure storage 1120 is illustrated outside of the secure perimeter of the authentication device(s) 1110-1112, in one embodiment, each authentication device 1110-1112 may have its own integrated secure storage. Alternatively, each authentication device 1110-1112 may cryptographically protect the biometric reference data records (e.g., wrapping them using a symmetric key to make the storage 1120 secure).

Turning first to FIG. 11A, the illustrated embodiment includes a client 1100 equipped with one or more authentication devices 1110-1112 for enrolling and authenticating an end user. As mentioned above, the authentication devices 1110-1112 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards.

The authentication devices 1110-1112 are communicatively coupled to the client through an interface 1102 (e.g., an application programming interface or API) exposed by a secure transaction service 1101. The secure transaction service 1101 is a secure application for communicating with one or more secure transaction servers 1132-1133 over a network and for interfacing with a secure transaction plugin 1105 executed within the context of a web browser 1104. As illustrated, the Interface 1102 may also provide secure access to a secure storage device 1120 on the client 1100 which stores information related to each of the authentication devices 1110-1112 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 1130 over a network such as the Internet.

As discussed below, certain types of network transactions are supported by the secure transaction plugin 1105 such as HTTP or HTTPS transactions with websites 1131 or other servers. In one embodiment, the secure transaction plugin is initiated in response to specific HTML tags inserted into the HTML code of a web page by the web server 1131 within the secure enterprise or Web destination 1130 (sometimes simply referred to below as "server 1130"). In response to detecting such a tag, the secure transaction plugin 1105 may forward transactions to the secure transaction service 1101 for processing. In addition, for certain types of transactions (e.g., such as secure key exchange) the secure transaction service 1101 may open a direct communication channel with the on-premises transaction server 1132 (i.e., co-located with the website) or with an off-premises transaction server 1133.

The secure transaction servers 1132-1133 are coupled to a secure transaction database 1140 for storing user data, authentication device data, keys and other secure information needed to support the secure authentication transactions described below. It should be noted, however, that the underlying principles of the invention do not require the separation of logical components within the secure enterprise or web destination 1130 shown in FIG. 11A. For example, the website 1131 and the secure transaction servers 1132-1133 may be implemented within a single physical server or separate physical servers. Moreover, the website 1131 and transaction servers 1132-1133 may be implemented within an integrated software module executed on one or more servers for performing the functions described below.

As mentioned above, the underlying principles of the invention are not limited to a browser-based architecture shown in FIG. 11A. FIG. 11B illustrates an alternate implementation in which a stand-alone application 1154 utilizes the functionality provided by the secure transaction service 1101 to authenticate a user over a network. In one embodiment, the application 1154 is designed to establish communication sessions with one or more network services 1151 which rely on the secure transaction servers 1132-1133 for performing the user/client authentication techniques described in detail below.

In either of the embodiments shown in FIGS. 11A-B, the secure transaction servers 1132-1133 may generate the keys which are then securely transmitted to the secure transaction service 1101 and stored into the authentication devices within the secure storage 1120. Additionally, the secure transaction servers 1132-1133 manage the secure transaction database 1120 on the server side.

One embodiment of the invention employs implicit location-based authentication techniques in a manner which protects the end user's privacy. As mentioned above, sharing a user's current location (e.g., as provided by GPS) with relying parties raises significant privacy concerns. Consequently, users are often reluctant to share such data.

To address these issues, one embodiment of the invention uses geolocation as a factor when performing implicit user authentication but does not disclose the user's location to the relying party. This embodiment may be implemented alone or in combination with other non-intrusive 230 and/or explicit 222 authentication techniques described above (e.g., as part of a larger, comprehensive authentication process). Instead of transmitting the actual location from the client device, only an assurance level may be transmitted which is based (at least in part) on the geolocation data, thereby protecting the user's privacy.

One embodiment employs the following operations for user/device enrollment and registration with a relying party:

1. The user picks and specifies one or more locations where he/she usually performs authentication with websites. This may be a region within a predefined miles or specific locations (like office, home, transportation route, etc). These selected locations may be stored locally on the client device and will not be sent to the relying party. These operations may be performed by the location authentication module 231 described above.

2. In one embodiment, after enrollment is complete, the client device shares a key with the relying party over a secure communication channel (e.g., using secure communication module 213 and other registration techniques described herein).

In one embodiment, the following operations are performed during authentication:

1. The client device determines its current location using one or more geolocation techniques (e.g., retrieving the current location using a location sensor 241 such as an embedded GPS chip).

2. The location authentication module 231 on the client compares the current location with already enrolled locations and produces a score indicating the distance (e.g., from 0-100). The assurance calculation module 212 may then include the score in its assurance calculations (as described above).

3. the client device generates a signature, signs the score/assurance level and sends it to the relying party 250 for final authentication.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A method implemented by at least one of a client device and a server remotely coupled to the client device of a client, comprising:

receiving a client request from the client to perform a transaction which requires authentication;

analyzing first data related to the client to determine a risk value associated with the client, wherein the risk value is based on an Internet Protocol (IP) variable of the client device of the client;

determining, based on the risk value, a required assurance level for allowing the client to complete the transaction;

associating an intrusiveness value with authentication techniques available on the client, wherein authentication techniques deemed non-intrusive include location-based authentication techniques and/or user behavior detection techniques, and wherein authentication techniques deemed explicit include biometric authentication modalities including fingerprint, face or speaker authentication and/or user password or personal identification number (PIN) entry;

receiving, from the client, a current assurance level that is based on a comparison between historical measurements and a current measurement by one or more non-intrusive authentication techniques of the client, the non-intrusive authentication techniques including one or more techniques that do not require explicit user input, wherein the measurements include an identity of a computer network to which the client device is connected;

determining an assurance level gain required to arrive at the required assurance level based on the risk value, the assurance level gain to be combined with the current assurance level to arrive at or surpass the required assurance level for allowing the client to complete the transaction;

authenticating the client request using one or more explicit authentication techniques of the client in addition to the one or more non-intrusive authentication techniques, wherein an explicit authentication technique includes one or more techniques that require an explicit user input to unlock the client device, and wherein the one or more explicit authentication techniques are selected based at least in part on the intrusiveness value associated with the explicit authentication techniques, wherein authentication techniques which are relatively less intrusive but which still result in an acceptable assurance level gain are selected above techniques which are relatively more intrusive;

performing the transaction after the authenticating by at least one of the client device and server.

2. The method as in claim 1 wherein the operations of determining the required assurance level and assurance level gain are performed on the server remote from the client.

3. The method as in claim 1 wherein the risk value comprises an implicit assurance level, wherein the assurance level gain added to the implicit assurance level must be sufficient to arrive at the required assurance level for allowing the client to complete the transaction.

4. The method as in claim 1 wherein the operation of selecting one or more explicit authentication techniques based at least in part on an indication of an assurance level gain is performed on a server remote from the client.

5. The method as in claim 1 wherein the operation of selecting one or more explicit authentication techniques based at least in part on the indication of the assurance level gain is performed on the client.

6. The method as in claim 1 wherein the first data related to the client includes an amount of time since a last successful explicit authentication.

7. The method as in claim 6 wherein the first data further includes an indication of a current location and/or user behavior data collected from sensors on the client.

8. The method as in claim 7 wherein current locations known to be visited by a user result in a relatively lower risk value.

9. The method as in claim 8 further comprising:
initially registering one or more locations where the user performs authentications as specified by the user; and
determining the risk value based, at least in part, on current distance from the one or more locations specified by the user.

10. The method as in claim 8 wherein the user behavior data includes gait data associated with the user, wherein gait data matching a known gait of the user results in a relatively lower risk value.

11. An apparatus comprising at least one of a client device of a client or a server remotely coupled to the client device, the apparatus further comprising:

a risk engine to analyze first data received as part of a transaction from the client device of the client to determine a risk value associated with the client, wherein the risk value is based on an Internet Protocol (IP) variable of the client device of the client;

an adaptive analysis module associating an intrusiveness value with authentication techniques available on the client, wherein authentication techniques deemed non-intrusive include location-based authentication techniques and/or user behavior detection techniques, and wherein authentication techniques deemed explicit include biometric authentication modalities including fingerprint, face or speaker authentication and/or user password or personal identification number (PIN) entry;

an assurance level gain analysis module remotely connected to the client device to determine, based on the risk value, a required assurance level for allowing the client to complete a transaction, an assurance level gain required to arrive at the required assurance level based on the risk value, and a current assurance level, received from the client, that is based on historical measurements and a current measurement by one or more non-intrusive authentication techniques of the client, wherein the measurements include an identity of a computer network to which the client device is connected, the non-intrusive authentication techniques including one or more techniques which do not require explicit user input, wherein the assurance level gain is to be combined with the current assurance level to arrive at or surpass the required assurance level for allowing the client to complete the transaction;

an adaptive authentication module remotely connected to the client device to authenticate a client request, using one or more explicit authentication techniques of the client in addition to the one or more non-intrusive authentication techniques, wherein an explicit authentication technique includes one or more techniques that require an explicit user input to unlock the client device, and wherein the one or more explicit authentication techniques are selected based at least in part on the intrusiveness value associated with the explicit authentication techniques, wherein authentication techniques which are relatively less intrusive but which still result in an acceptable assurance level gain are selected above techniques which are relatively more intrusive;

and wherein the apparatus is operative to perform the transaction after the authenticating.

12. The apparatus as in claim 11 wherein the operations of determining the required assurance level and assurance level gain are performed on the server remote from the client.

13. The apparatus as in claim 11 wherein the risk value comprises an implicit assurance level, wherein the assurance level gain added to the implicit assurance level must be sufficient to arrive at the required assurance level for allowing the client to complete the transaction.

14. The apparatus as in claim 11 wherein the adaptive authentication module selecting one or more explicit authentication techniques based at least in part on an indication of an assurance level gain is on a server remote from the client.

15. The apparatus as in claim 11 wherein the adaptive authentication module selecting one or more explicit authentication techniques based at least in part on the indication of the assurance level gain is on the client.

16. The apparatus as in claim 11 wherein the first data related to the client includes an amount of time since a last successful explicit authentication.

17. The apparatus as in claim 16 wherein the first data further includes an indication of a current location and/or user behavior data collected from sensors on the client.

18. The apparatus as in claim 17 wherein current locations known to be visited by a user result in a relatively lower risk value.

19. The apparatus as in claim 18 wherein one or more locations where the user performs authentications are initially specified by the user; and wherein the risk value is determined, at least in part, on current distance from the one or more locations specified by the user.

20. The apparatus as in claim 18 wherein the user behavior data includes gait data associated with the user, wherein gait data matching a known gait of the user results in a relatively lower risk value.

* * * * *